(12) United States Patent
Nikolaidis et al.

(10) Patent No.: US 10,686,679 B2
(45) Date of Patent: Jun. 16, 2020

(54) FORWARDING ELEMENT DATA PLANE WITH FLOW SIZE DETECTOR

(71) Applicant: Barefoot Networks, Inc., Santa Clara, CA (US)

(72) Inventors: Georgios Nikolaidis, Palo Alto, CA (US); Jeongkeun Lee, Mountain View, CA (US); Masoud Moshref Javadi, Sunnyvale, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/051,399

(22) Filed: Jul. 31, 2018

(65) Prior Publication Data

US 2019/0356563 A1    Nov. 21, 2019

Related U.S. Application Data

(60) Provisional application No. 62/690,954, filed on Jun. 28, 2018, provisional application No. 62/674,596, filed on May 21, 2018.

(51) Int. Cl.
*H04L 12/26* (2006.01)
*H04L 12/823* (2013.01)
(Continued)

(52) U.S. Cl.
CPC .......... *H04L 43/026* (2013.01); *H04L 41/142* (2013.01); *H04L 43/16* (2013.01);
(Continued)

(58) Field of Classification Search
CPC ... H04L 47/10; H04L 47/2441; H04L 47/125; H04L 45/38; H04L 45/745; H04L 43/026; H04L 47/32
See application file for complete search history.

(56) References Cited

U.S. PATENT DOCUMENTS 7,369,557 B1 * 5/2008 Sinha .................... H04L 45/38
370/392
8,750,119 B2    6/2014 Lambeth et al.
(Continued)

FOREIGN PATENT DOCUMENTS

WO    2019226215 A1    11/2019
WO    2019226216 A1    11/2019

OTHER PUBLICATIONS

Cormode, Graham, et al., "An Improved Data Stream Summary: The Count-Min Sketch and its Applications," Latin 2004—Proceedings of 6th Latin American Symposium: Theoretical Informatics, Apr. 5-8, 2004, 11 pages, Springer, Buenos Aires, Argentina. Retrieved from https://www.cse.unsw.edu.au/~cs9314/07s1/lectures/Lin_CS9314_References/cm-latin.pdf.
(Continued)

*Primary Examiner* — Dady Chery
(74) *Attorney, Agent, or Firm* — Compass IP Law PC

(57) ABSTRACT

Some embodiments of the invention provide a data-plane forwarding circuit (data plane) that has a flow-size detection circuit that generates flow-size density distribution for all or some of the data message flows that it processes for forwarding in a network. The flow-size (FS) detection circuit in some embodiments generates statistical values regarding the processed data message flows, and based on these statistical values, it generates a FS density distribution that expresses a number of flows in different flow-size sub-ranges in a range of flow sizes. In some embodiments, the density distribution is a probabilistic density distribution that is based on probabilistic statistical values that the flow-size detection circuit generates for the data message flows that are processed for forwarding within the network. The FS detection circuit in some embodiments generates probabilistic statistical values for the data message flows by generating hash values from header values of the data message
(Continued)

flows and accumulating flow-size values at memory locations identified by the generated hash values. In some embodiments, the generated hashes for different data message flows can collide, which results in the accumulated flow-size values being probabilistic values that might have a certain level of inaccuracy.

20 Claims, 14 Drawing Sheets

(51) Int. Cl.
| | |
|---|---|
| H04L 12/24 | (2006.01) |
| H04L 12/761 | (2013.01) |
| H04L 12/721 | (2013.01) |
| H04L 12/715 | (2013.01) |
| H04L 12/743 | (2013.01) |
| H04L 12/801 | (2013.01) |
| H04L 12/851 | (2013.01) |
| H04L 12/935 | (2013.01) |
| H04L 12/861 | (2013.01) |

(52) U.S. Cl.
CPC .............. *H04L 45/16* (2013.01); *H04L 45/38* (2013.01); *H04L 45/64* (2013.01); *H04L 45/7453* (2013.01); *H04L 47/11* (2013.01); *H04L 47/12* (2013.01); *H04L 47/2441* (2013.01); *H04L 47/2483* (2013.01); *H04L 47/32* (2013.01); *H04L 49/3009* (2013.01); *H04L 49/90* (2013.01)

(56) References Cited

U.S. PATENT DOCUMENTS

| | | | |
|---|---|---|---|
| 2015/0163142 A1* | 6/2015 | Pettit ................. | H04L 47/125 370/230 |
| 2017/0093986 A1 | 3/2017 | Kim et al. | |
| 2017/0118090 A1 | 4/2017 | Pettit et al. | |
| 2018/0011850 A1 | 1/2018 | Hao et al. | |
| 2019/0356563 A1 | 11/2019 | Nikolaidis et al. | |
| 2019/0356592 A1 | 11/2019 | Nikolaidis et al. | |
| 2019/0356593 A1 | 11/2019 | Nikolaidis et al. | |

OTHER PUBLICATIONS

Kumar, Abhishek, et al., "Data Streaming Algorithms for Efficient and Accurate Estimation of Flow Size Distribution," SIGMETRICS/Performance'04, Jun. 12-16, 2004, 12 pages, ACM, New York, NY, USA.

Sekar, Was, et al., "Revisiting the Case for a Minimalist Approach for Network Flow Monitoring," IMC'10, Nov. 1-3, 2010, 14 pages, ACM, Melbourne, Australia.

Liu, Zehui, et al., "An Adaptive Approach for Elephant Flow Detection with the Rapidly Changing Traffic in Data Center Network," International Journal of Network Management, Jun. 1, 2017, 13 pages, 2017, e1987, John Wiley & Sons, Ltd.

Non-Published Commonly Owned International Patent Application PCT/US2019/021467, filed Mar. 8, 2019, 52 pages, Barefoot Networks, Inc.

PCT International Search Report and Written Opinion of Commonly Owned International Patent Application PCT/US2019/021467, dated May 23, 2019, 7 pages, International Searching Authority (US).

Sivaraman, Vibhaalakshmi, et al., "Heavy-Hitter Detection Entirely in the Data Plane," Proceedings of the Symposium on SDN Research, Apr. 3-4, 2017, 13 pages, ACM, Santa Clara, CA, USA.

First Office Action for U.S. Appl. No. 16051405, dated Dec. 19, 2019, 23 pages.

Non-Published Commonly Owned International Patent Application PCT/US2019/021456, filed Mar. 8, 2019, 54 pages, Barefoot Networks, Inc.

Non-Published commonly owned U.S. Appl. No. 16/051,405, filed Jul. 31, 2018, 54 pages, Barefoot Networks, Inc.

Non-Published commonly owned U.S. Appl. No. 16/051,417, filed Jul. 31, 2018, 53 pages, Barefoot Networks, Inc.

PCT International Search Report and Written Opinion of Commonly Owned International Patent Application PCT/US2019/021456, dated May 24, 2019, 7 pages, International Searching Authority (US).

* cited by examiner

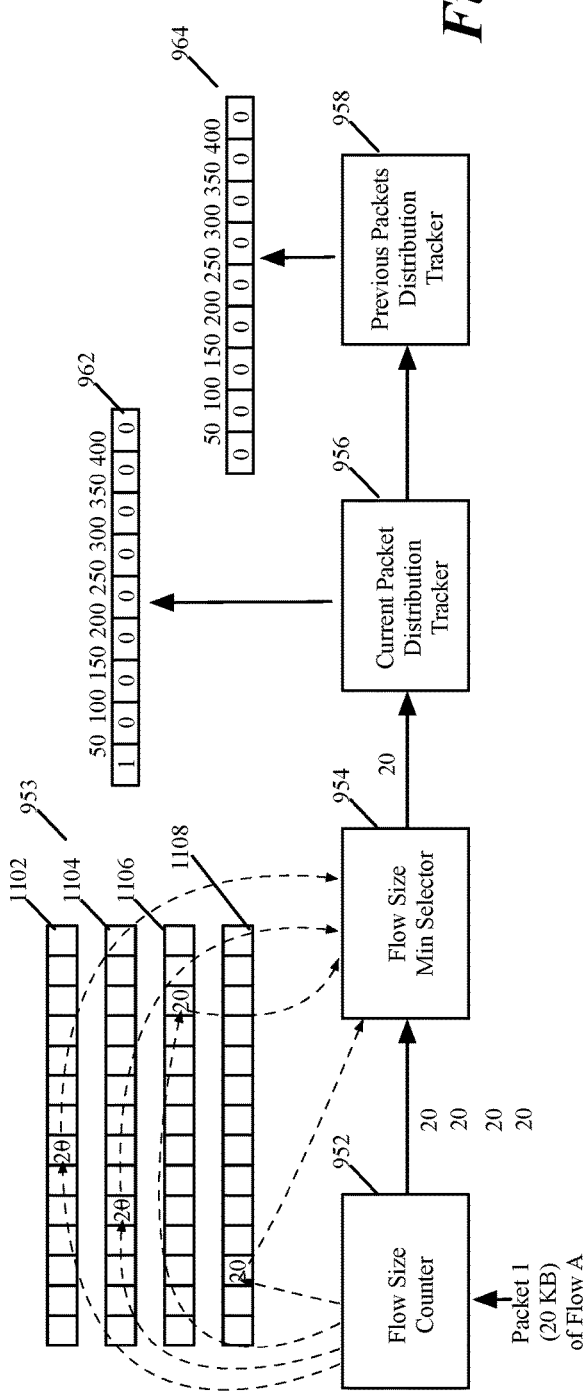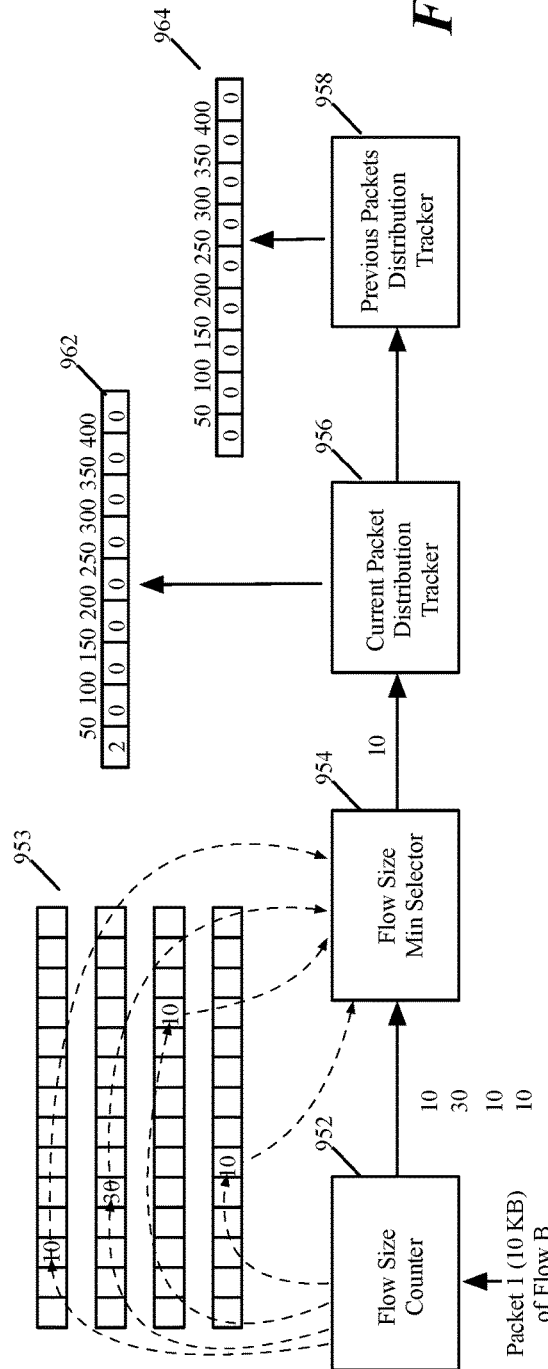

FORWARDING ELEMENT DATA PLANE WITH FLOW SIZE DETECTOR

BACKGROUND

Switches need to forward packets for flows with varying requirements. While the majority of flows have modest throughput demands, a small subset usually takes up a significant part of the available capacity. These flows are called heavy hitters. When left unrestricted, heavy hitters lead to drops and build-up of queues for all flows. Thus, it is desirable to identify heavy hitters and mitigate their adverse effects to other flows' completion time by using techniques such as fair packet drop, priority queuing etc.

BRIEF SUMMARY

Some embodiments of the invention provide a data-plane forwarding circuit (data plane) that has a flow-size detection circuit that generates flow-size density distribution for all or some of the data message flows that it processes for forwarding in a network. To perform its forwarding operations, the data plane includes several data message processing stages that are configured to process the data tuples associated with the data messages received by the data plane. In some embodiments, parts of the data plane message-processing stages are also configured to implement a flow-size detection circuit. In other embodiments, the data plane has a dedicated flow-sized detection circuit that does not use re-purposed message processing stages for flow-size detection operations.

The operations of the data plane's message processing stages are configured by a local or remote control plane in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

The flow-size (FS) detection circuit in some embodiments generates statistical values regarding the processed data message flows, and based on these statistical values, it generates a FS density distribution that expresses a number of flows in different flow-size sub-ranges in a range of flow sizes. In some embodiments, the density distribution is a probabilistic density distribution that is based on probabilistic statistical values that the flow-size detection circuit generates for the data message flows that are processed for forwarding within the network. The FS detection circuit in some embodiments generates probabilistic statistical values for the data message flows by generating hash values from header values of the data message flows and accumulating flow-size values at memory locations identified by the generated hash values. In some embodiments, the generated hashes for different data message flows can collide, which results in the accumulated flow-size values being probabilistic values that might have a certain level of inaccuracy.

The density distribution that the FS detection circuit produces is a FS density distribution (FSDD) that is defined over a programmable period of time. For instance, the flow-size detection circuit produces a first FS density distribution that expresses a number of processed flows in the different flow-size sub-ranges during a first time period, and then produces a second FS density distribution that expresses a number of flows in the different flow-size sub-ranges during a second time period.

In some embodiments, the control plane of the forwarding element retrieves the FS density distribution that the data plane's FS detection circuit produces through a control plane interface of the data plane. In other embodiments, the data plane has a message generator that generates data messages that the FS detection circuit populates with the FS density distribution that it produces. The data plane then forwards these FSDD-populated data messages to its forwarding element's control plane through its control plane interface in some embodiments. In other embodiments, the data plane forwards these FSDD-populated data messages to a machine separate from the network forwarding element through the network.

To produce the FS density distribution for a particular time period, the FS detection circuit uses two different FS distribution trackers. The first distribution tracker is a current message FS distribution tracker that updates a first FSDD that is stored for the particular time period in a first FSDD register based on a payload size of a currently processed message that is part of a particular message flow. The second distribution tracker is a previous messages FS distribution tracker that updates a second FSDD stored in a second FSDD register in order to negate redundant updates to the first FSDD register for multiple messages for each processed message flow during the time period.

More specifically, each FSDD register has several cells with each cell corresponding to a different sub-range of FS values. To update the first FSDD register for the current message that is part of a particular message flow, the first distribution tracker increments by one the value stored in the first FSDD register cell that corresponds to a first flow size that the FS detection circuit maintains for the particular message flow in the particular time period. The first flow size includes the payload size of the current message.

As mentioned above, the flow-size detection circuit in some embodiments maintains a probabilistic flow size for each particular message flow that the data plane processes in each particular time period. During the particular time period, the FS detection circuit might process more than one message of a particular message flow. For each of these messages, the first distribution tracker updates the first FSDD in the first FSDD register. Each update after the first one for a particular message flow in a particular time period is redundant, except for when a subsequent update increments a subsequent register cell that is associated with a subsequent FS range to indicate that the flow size of the particular data message flow has gone from one FS sub-range to another FS sub-range.

Hence, to account for multiple redundant updates to the first FSDD register for one particular data message flow during a particular time period, the FS detection circuit uses the second distribution tracker. To update the second FSDD register for the current message, the second distribution tracker increments by one the value stored in the second FSDD register cell that corresponds to a second flow size that the FS detection circuit maintained for the particular message flow before the processing of the received message. In some embodiments, the second distribution tracker computes the second flow size by subtracting the current message's payload size from the first flow size that the flow-detection circuit produces for the current message. The FSDD for the particular time period is the first FSDD of the first FSDD register minus the second FSDD of the second FSDD register. Hence, the update to the second FSDD based on the current message is intended to remove from the FSDD for the particular time period any previous contribution of any prior message of the particular data message flow to the first FSDD.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

FIGS. 11-13 show the operations that an FS detection circuit performs for the three data messages processed in one time interval.

DETAILED DESCRIPTION

Figure 1:
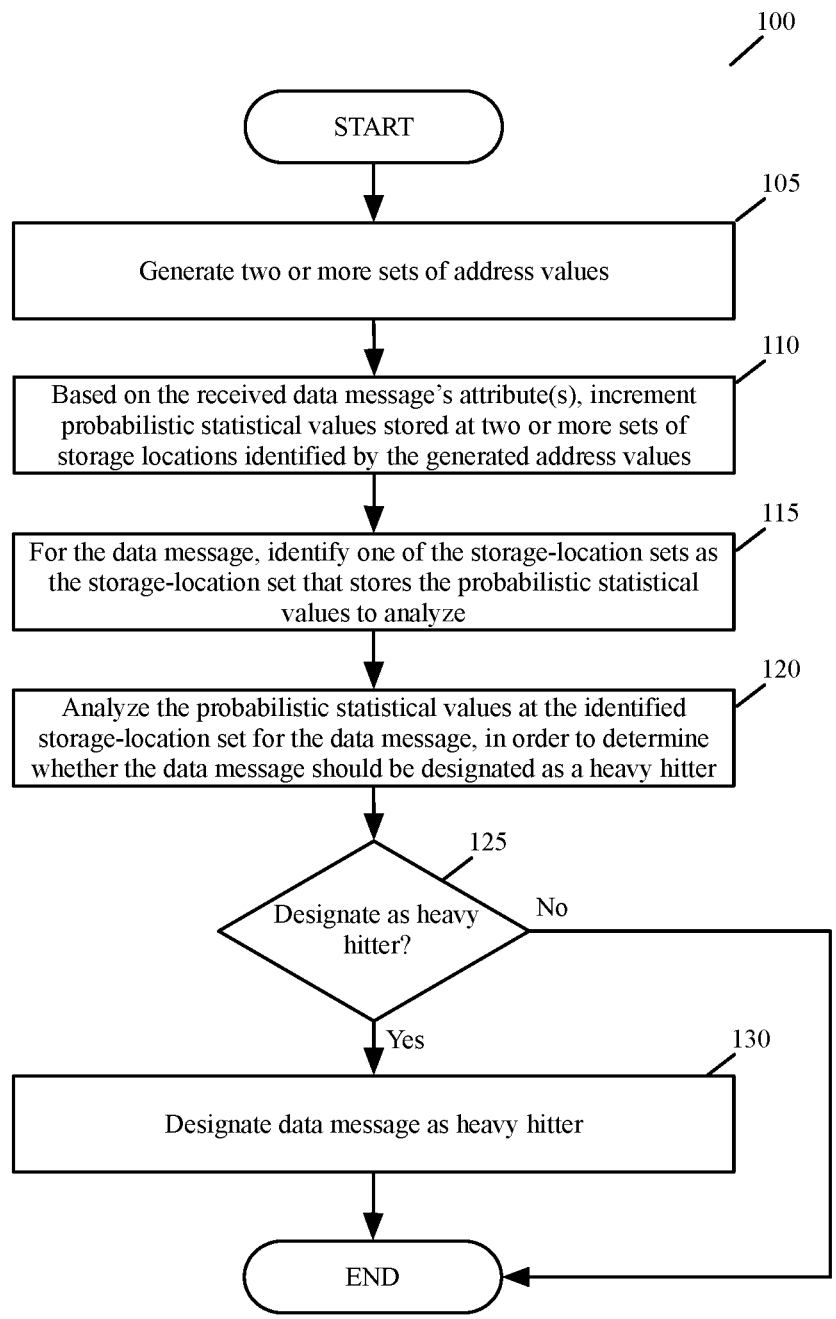
FIG. 1 illustrates a process of some embodiments that is performed by the data plane of a network forwarding element in order to detect large data message flows processed by the data plane.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for identifying large data message flows that are processed by a network forwarding element. For a data message received by the forwarding element, the method generates two sets of storage address values. To account for the received data message, the method increments statistical values stored in two sets of storage locations identified by the two sets of generated address values. Based on a set of interleaving criteria that identifies one of the two sets of storage locations as the storage-location set that stores the statistical values that have to be analyzed for the message, the method then analyzes the statistical values stored by the identified set of storage locations to determine whether the message is part of a large flow. The method then designates the data message as a message that is part of a large flow if it determines that the data message is part of a large flow.

The generated and analyzed statistical values in some embodiments are probabilistic values. These probabilistic values are not deterministic statistical values that are computed by using a deterministic computational model. Rather, the probabilistic values are computed by using a probabilistic computational model that is defined to convey the occurrence of an event (in this case, the likelihood that a data message flow is part of a large data message flow) with a certain level of probability. Different embodiments use different probabilistic computational models to determine whether the data message flows that are part of large data message flows. For instance, as further described below, some embodiments use the count-min sketch model for this determination. However, one of ordinary skill will realize that other embodiments use other probabilistic computational models.

In this document, large data message flows are referred to as heavy hitter flows. Heavy hitter (HH) flows in some embodiments are flows that exceed a certain number of messages or certain amount of message payload (e.g., 50-100 KB) within a certain duration of time (e.g., 1 ms). Heavy hitter flows can also be referred to by other names, such as mega flows, elephant flows, etc. Also, in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1 conceptually illustrates a process 100 that the data plane of a network forwarding element performs in some embodiments, in order to detect large data message flows (i.e., flows referred to as heavy hitters, mega flows, elephant flows, etc.) processed by the data plane. By using this process 100, the data plane in some embodiments accumulates probabilistic statistical values for each processed data message flow in two or more sets of storage locations. The data plane resets and reads sets of storage locations in an interleaved manner to ensure that each storage-location set, after being reset, is afforded an accumulation-only time period during which it accumulates probabilistic statistical values without being read. Under this interleaved approach, the process 100 at any given time reads (i.e., analyzes probabilistic values from) only one storage-location set for a received data message from the two or more sets of storage locations that are associated with the data message.

For a received data message, the method generates (at 105) several sets of address values based on a set of identifiers associated with the data message. In some embodiments, each generated address value is a hash value that is generated by a hash generator from the data message's flow identifier (e.g., five-tuple identifier) of the received data messages. For example, to generate each set of hash address values, the process 100 in some embodiments uses multiple hash generators to generate multiple hash address values from the data message's five-tuple identifier (i.e., the source and destination IP address, the source and destination port address and protocol specified in the data message's header). In other embodiments, the process 100 uses one hash generator to generate one hash value from the data message's flow identifier, and then uses several different parts of the generated hash value to specify several hash address values.

Figure 2:
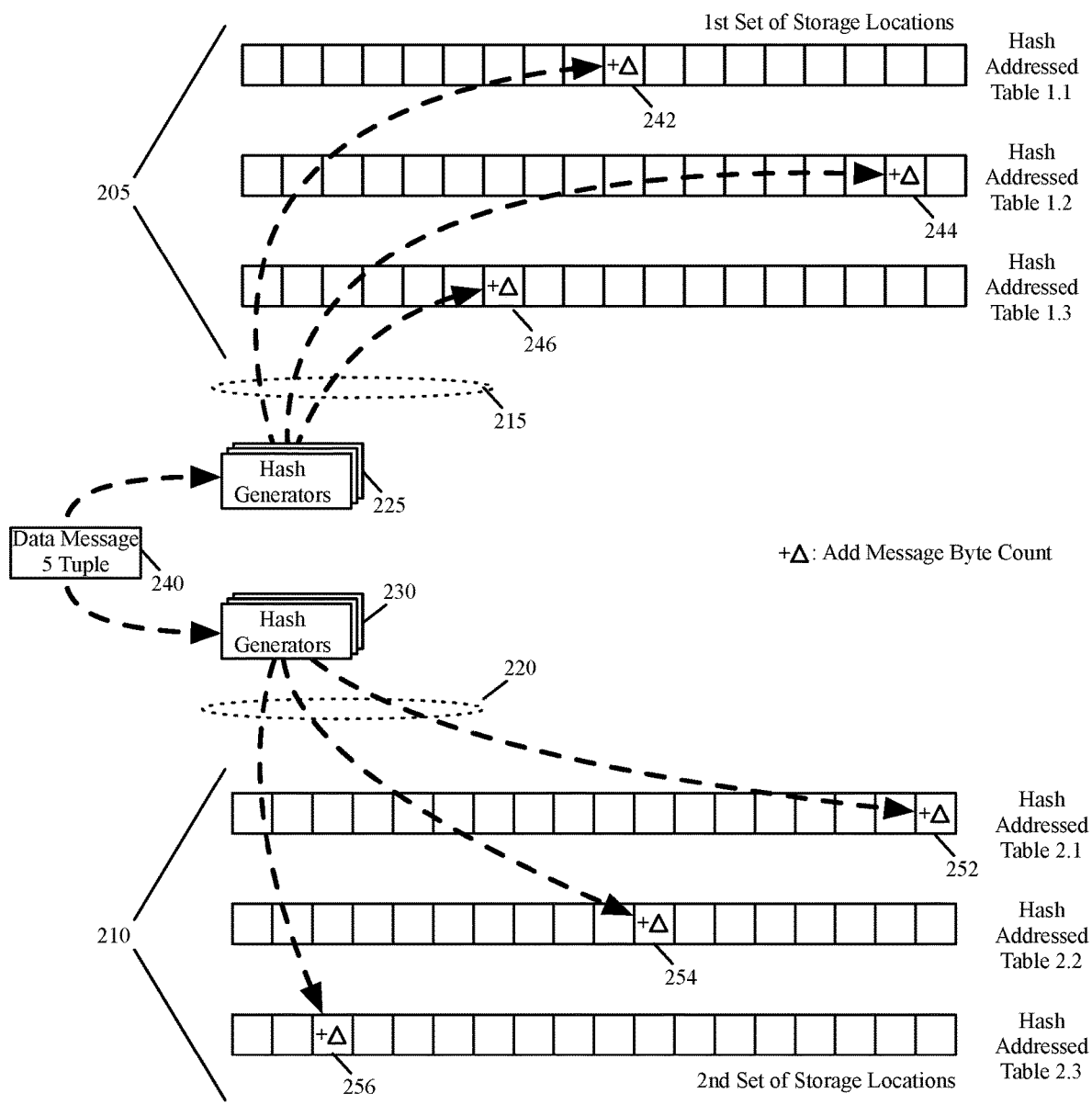
FIG. 2 illustrates an example that uses two different sets of hash addressed tables that are addressed by two different sets of hash values.

Each set of generated addresses identify several locations in several sets of storages. FIG. 2 illustrates an example that uses two different sets of hash addressed tables 205 and 210 that are addressed by two different sets of hash values 215 and 220. In this example, the two sets of hash values 215 and 220 are generated by two sets of hash generators 225 and 230 from a data message's five tuple identifier 240. As shown, each generated hash value in each set 225 or 230 identifies a storage location in one hash table of each hash-table set 205 and 210. Specifically, the three generated hash address values in the set 215 respectively identify three locations 242, 244 and 246 in the first set of tables 205, and the three generated hash address values in the set 220 respectively identify three locations 252, 254 and 256 in the second set of tables 210.

After generating (at 105) the address values from the received data message's identifier set, the process 100 increments (at 110) several probabilistic statistical values that are stored at the storage locations identified by the generated address values. FIG. 2 illustrates the addition of the received data message's byte count to the byte count value stored at the three locations 242, 244 and 246 in the first set of tables 205, and the three locations 252, 254 and 256 in the second set of tables 210. Other embodiments, however, accumulate and store other message attributes, or even just accumulate and store the number of data messages, in the hash-addressed storage locations.

Figure 3:
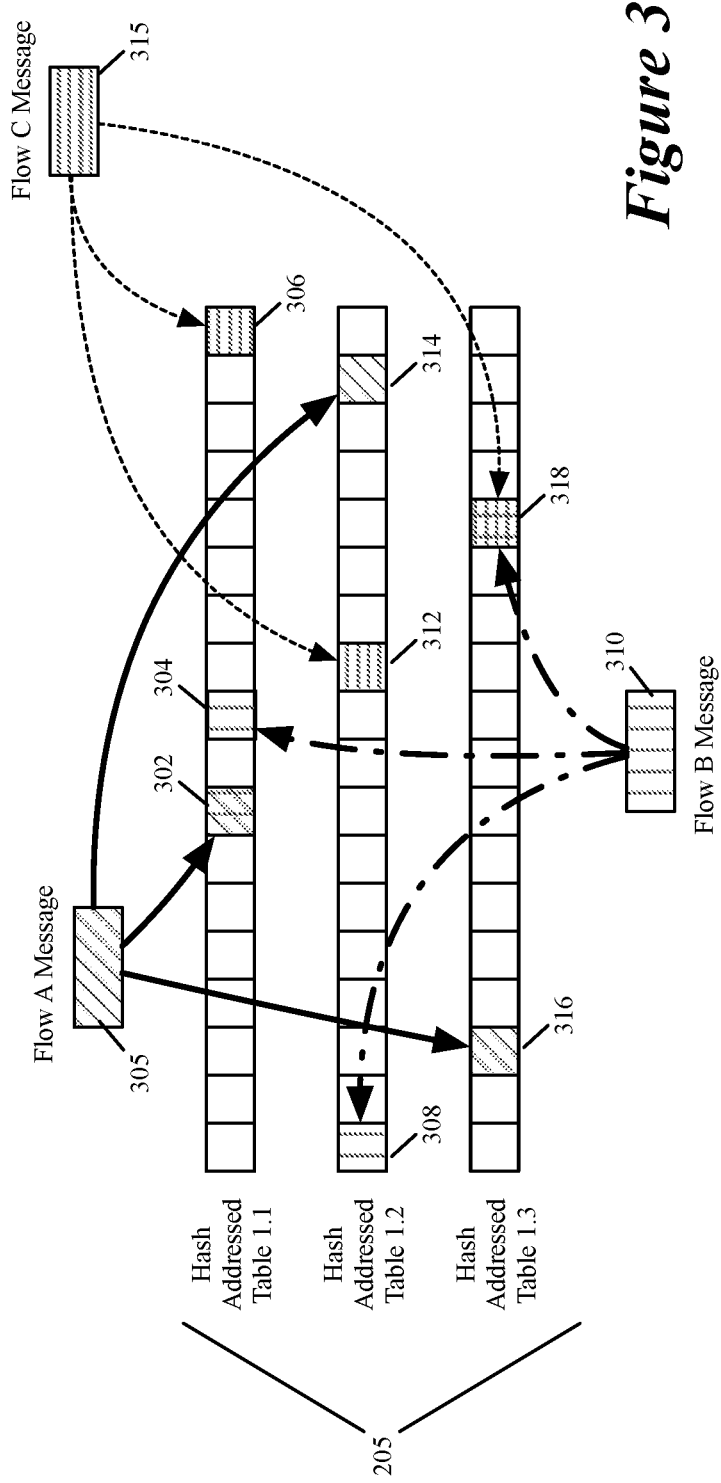
FIG. 3 illustrates an example of accumulating statistics for three different messages of three different message flows in the first set of hash tables.

Under the approach illustrated in FIG. 2, hash collisions can occur, which would then render inaccurate the statistics maintained at the storage location identified by two colliding hash values of two different message flows. FIG. 3 illustrates an example of accumulating statistics for three different messages 305, 310 and 315 of three different message flows in the first set 205 of hash tables. In this example, each message's five tuple identifier is hashed to a unique storage location 302, 304, 306, 308, 312, 314 or 316, except for the third hash of the second and third messages 310 and 315, which collide to identify the same location 318. Hence, in this example, the data maintained at storage location 318 of the third table of the first hash-table set 205 is corrupted as it includes statistics that are accumulated for both the second and third data message flows.

However, dealing with accumulated statistical inaccuracies due to hash collisions is built into the probabilistic statistics accumulation model of FIG. 2. As further described below, the probabilistic statistics accumulation model of FIG. 2 addresses inaccuracies due to hash collisions by using the minimum byte count that is stored for a data message in the hash-addressed storage locations of one of the hash table sets in order to determine whether the data message is part of a HH flow. This approach is a count-min sketch approach, with each hash-addressed table maintaining a statistical sketch of the processed data message flows, and at any given time, using the minimum generated count for each data message flow to evaluate the HH status of the flow.

After incrementing (at 110) several probabilistic statistical values that are stored at the storage locations identified by the generated address values, the process 100 identifies (at 115) one of the storage-location sets as the storage-location set that stores the probabilistic statistical values to analyze for the received data message. As mentioned above, the data plane periodically resets the different sets of storage locations, but resets them at different times so that after being reset, each storage-location set operates in an accumulate-only period to store probabilistic statistical values before operating in an accumulate-and-access period during which it can be read to determine whether a data message is part of a large data message flow.

Figure 4:
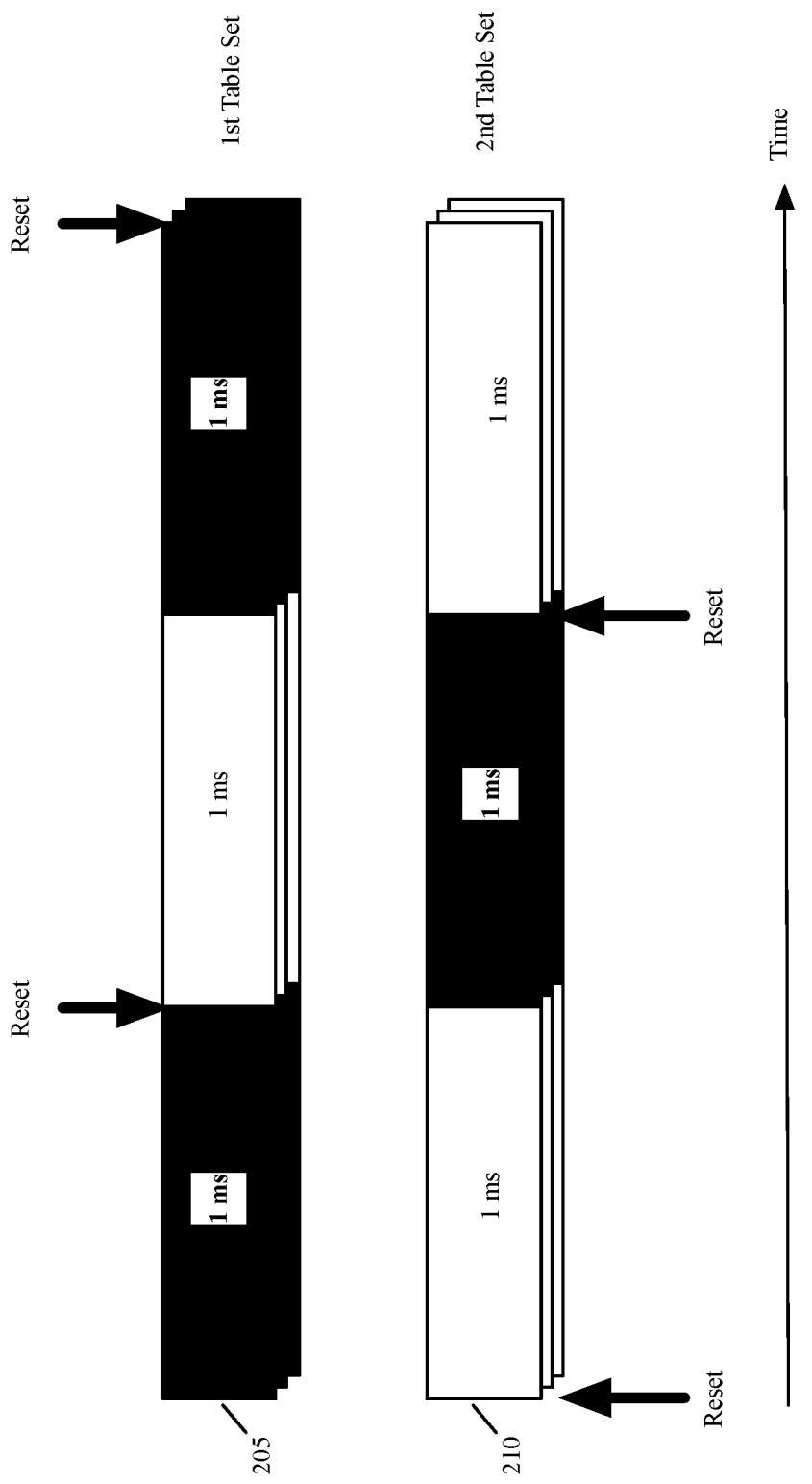
FIG. 4 illustrates the periodic resetting of the two sets of hash addressable tables of FIG. 2, as well as the accumulate-only periods and the accumulate-and-access periods of each of the two hash addressable table sets.

FIG. 4 illustrates the periodic resetting of the two sets of hash addressable tables 205 and 210 of FIG. 2, as well as the accumulate-only periods and the accumulate-and-access periods of each of the two hash addressable table sets. In this example, the accumulate-only periods are referred to as the write-only time periods, while the accumulate-and-access periods are referred to as the read-write time periods. As shown, the data plane periodically resets each table set every 2-ms, but interleaves this resetting so that in each 2-ms period, the first table set 205 operates in a write-only mode for a first 1-ms sub-period and in a read-write mode for a second 1-ms sub-period, while the second table set 210 operates in a read-write mode for the first 1-ms sub-period and in a write-only mode for the second 1-ms sub-period.

Thus, while one storage-location set operates in its write-only first period after being reset, the other storage-location set operates in a read-write second period to store probabilistic statistical values and to provide stored probabilistic statistical values to determine whether any data message is part of a large data message flow. Accordingly, when the process 100 receives a data message under this approach, the process generates first and second sets of storage address values (e.g., two sets of hash values), and increments probabilistic statistical values stored in both table sets 205 and 210 at several locations identified by the several generated hash values, in order to account for the received data message. However, to determine whether the received data message is part of a HH flow at any given time, the process 100 only analyzes the statistical values stored at the addressed locations of the table set that is operating in its read-write period at that time.

After identifying (at 115) one of the storage-location sets as the storage-location set that stores the probabilistic statistical values to analyze for the received data message, the process analyzes (at 120) the probabilistic statistical values stored at the identified storage-location set at the locations that were incremented at 110 (i.e., at the locations specified by the addresses generated at 105), in order to determine whether the data message should be designated as being part of an HH flow.

Figure 5:
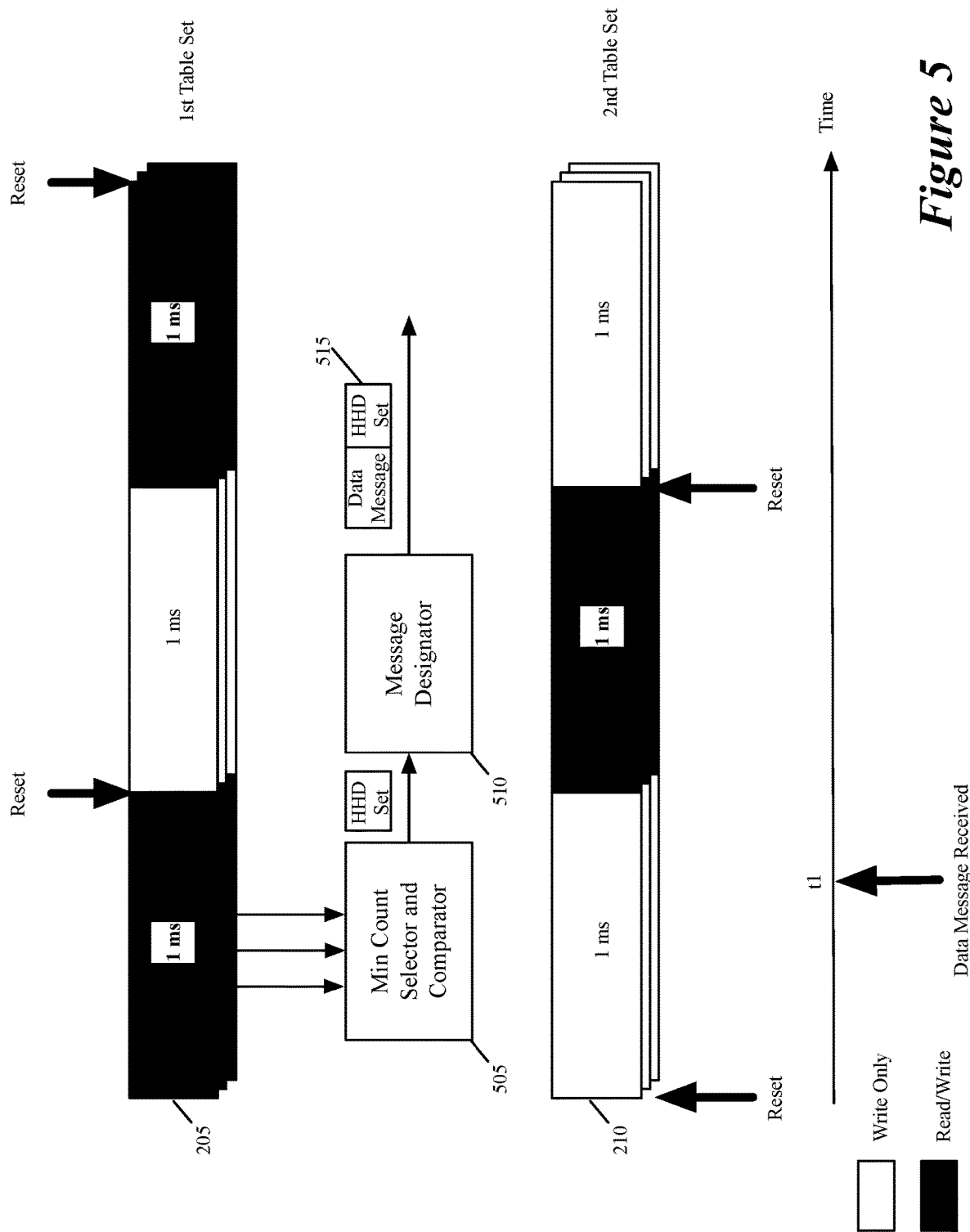
FIG. 5 illustrates an example of a received data message.

FIG. 5 illustrates an example of a data message being received at time t1. At this time, the first set of hash tables 205 operates in its read-write mode. Accordingly, to determine whether the received data message should be designated as being part of a HH flow, the three hash tables of this set 205 are read at the three storage locations associated with the received data message (i.e., at the locations in this set of tables 205 specified by the addresses generated at 105 for the received data message). In this example, the three read data values are three byte-count values, which are supplied to a min count selector/comparator 505. This module selects the smallest of the three byte-count values and then determines whether this smallest value exceeds a threshold byte count.

When this is the case, the assumption is that the data message belongs to a HH flow, because while any one or two hash-addressed locations might have suffered from hash collisions between multiple different flows, the odds of all three hash-addressed locations being corrupted is very low. Also, the location with the smallest byte-count value is least likely to have been corrupted. This is because the corrupted locations would necessarily have larger byte counts because their byte counts would account for the byte counts of the messages from the same flow as the received data messages, and the byte counts of other colliding message flows. On the other hand, the location with the smallest byte-count value would probably reflect just the byte count for the received message flow.

One of ordinary skill will realize that in other embodiments the process 100 does not use the min count selector/comparator 505 in FIG. 5. For instance, as further described below, the process 100 in some embodiments is implemented by stateful arithmetic logic units (ALUs) that after incrementing their respective probabilistic statistical value for a data message, perform a thresholding operation to determine whether their respective incremented value exceeds a threshold, and if so, output a bit to indicate that according to their records, the data message is part of a HH flow. In these embodiments, the data message is designated as being part of a HH flow, when the bits output from all the stateful ALUs indicate that the data message is part of a HH flow.

After analyzing (at 120) the probabilistic statistical values stored at the identified storage-location set, the process determines (at 125) whether the data message should be designated as being part of an HH flow. If not, the process ends. Otherwise, the process designates (at 130) the data message as being part of a HH flow. FIG. 5 illustrates this by presenting a message designator 510 that (1) receives an HHD set bit from the min count selector/comparator 505 (which indicates that the three byte-counts all exceeded the threshold value), and (2) associated the data message with HHD set tag 515 (e.g., inserts this tag in a header of the data message or a header vector of the data message) that specifies that the data message is part of an HH flow. As further described below, this HHD designation can then be used by other components of the network forwarding element or by other network forwarding elements or middlebox services to perform an operation on the data message. After 130, the process 100 ends.

Figure 6:
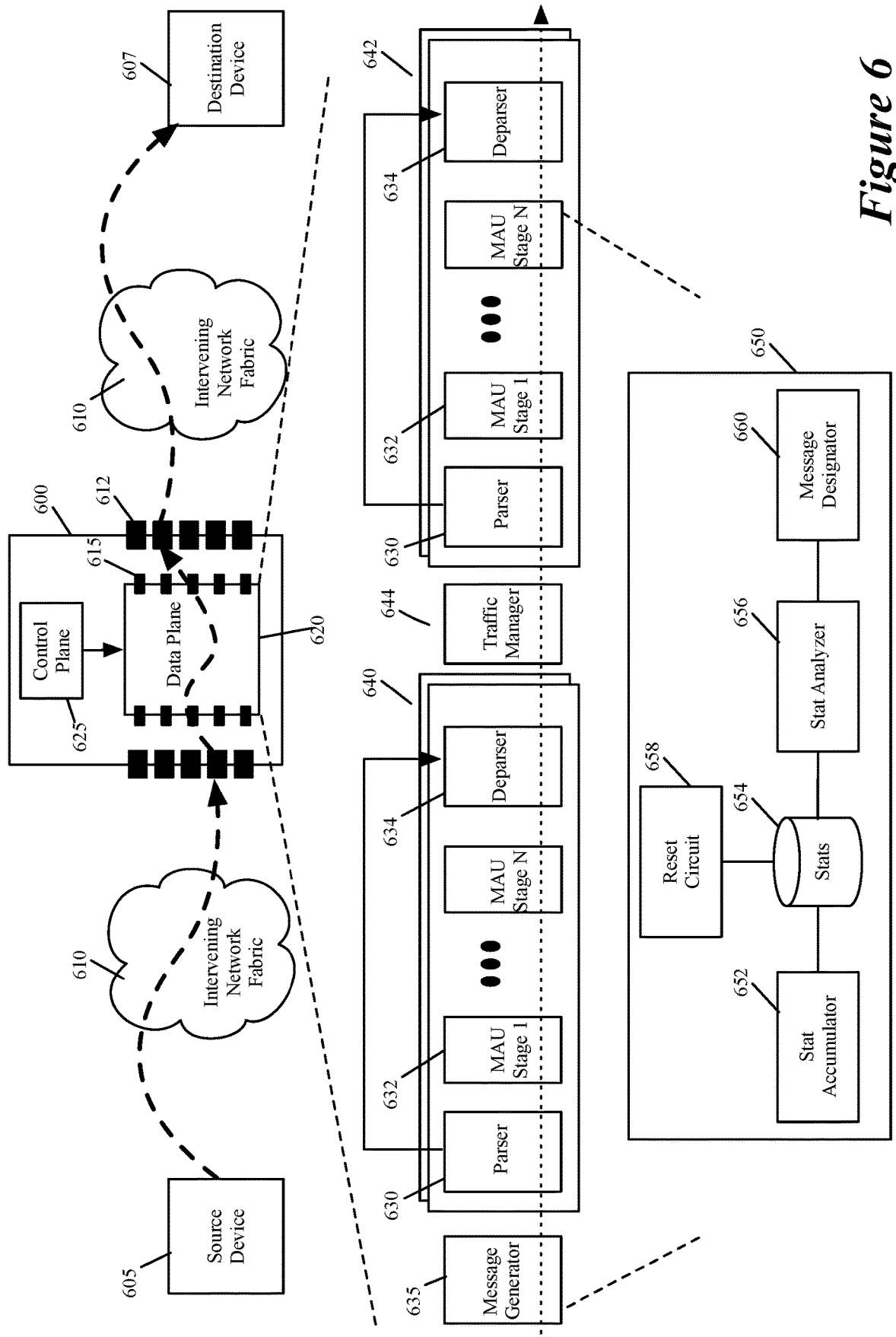
FIG. 6 illustrates an example of a forwarding element with a data plane circuit that can be configured to implement a heavy hitter (HH) detector that detects HH flows in the data plane.

FIG. 6 illustrates an example of a forwarding element 600 with a data plane circuit 620 that can be configured to implement an HH detector 650 that detects HH flows in the data plane. The forwarding element 600 forwards data messages within a network 610. The forwarding element 600 can be any type of forwarding element, such as a switch, a router, a bridge, etc. In FIG. 6, the forwarding element is deployed as a non-edge forwarding element in the interior of the network to forward data messages from a source device 605 to a destination device 607.

In other cases, the forwarding element 600 is deployed as an edge forwarding element at the edge of the network to connect to compute devices (e.g., standalone or host computers) that serve as sources and destinations of the data messages. As a non-edge forwarding element, the forwarding element 600 forwards data messages between forwarding elements in the network (i.e., through intervening network fabric 610). As an edge forwarding element, the forwarding element forwards data messages to and from edge compute devices to each other, to other edge forwarding elements and/or to non-edge forwarding elements.

As shown, the forwarding element 600 includes (1) a data plane circuit 620 (the "data plane 620") that performs the forwarding operations of the forwarding element 600 to forward data messages received by the forwarding element to other devices, and (2) a control plane circuit 625 (the "control plane 625") that configures the data plane circuit. The forwarding element 600 also includes physical ports 612 that receive data messages from, and transmit data messages to, devices outside of the forwarding element 600.

The control plane 625 configures the data plane 620. In some embodiments, the control plane includes (1) one or more processors (such as a microprocessor with multiple processing cores or units) that execute instructions, and (2) a memory that stores instructions for processes that when executed by the processors perform the control plane operations. These instructions can be specified by (1) a manufacturer of the network forwarding element 600 that includes the control and data planes 625 and 620, (2) a network administrator that deploys and maintains the network forwarding 600, or (3) one or more automated processes that execute on servers and/or network forwarding elements that monitor network conditions. The control plane processor, or another circuit of the control plane, communicates with the data plane (e.g., to configure the data plane or to receive statistics from the data plane) through a control/data plane interface.

The data plane circuit 620 includes ports 615 that receive data messages to process and transmit data messages after they have been processed. Some ports 615 of the data plane 620 are associated with the physical ports 612 of the forwarding element 600, while other ports 615 are associated with other modules of the data plane 620. The data plane 620 also includes message generators 635, multiple ingress pipeline stages 640, multiple egress pipeline stages 642, and a traffic manager 644. In some embodiments, the data plane is implemented on an application specific integrated circuit (ASIC), and its components are defined on this integrated circuit.

The message generators generate messages in the data plane. In some embodiments, these messages can direct circuits in the data plane to perform certain operations (e.g., to reset the storages that store the accumulated probabilistic statistics) or to store data (e.g., accumulated probabilistic statistics) in the messages for export to the control plane or to another device through a network. The ingress and egress pipelines process the data messages received by the forwarding element in order to forward these messages to their destinations in the network. The traffic manager 644 in some embodiments includes a crossbar switch that directs messages from the ingress pipelines to egress pipelines.

Each ingress or egress pipeline includes several configurable (i.e., programmable) message-processing stages 632 that can be configured to perform the data-plane forwarding operations of the forwarding element 600 to process and forward data messages to their destinations. These message-processing stages perform these forwarding operations by processing data tuples (e.g., message headers) associated with data messages received by the data plane 620 in order to determine how to forward the messages.

The message processing stages in this example are match-action units (MAUs) 632. As further described below by reference to FIG. 7, an MAU is a circuit in some embodiments that includes match tables that store multiple records for matching with data tuples (e.g., header vectors) of the processed data messages. When a data message matches a match record, the MAU then performs an action specified by an action record associated with the identified match record (e.g., an action record that is identified by the identified match record).

In some embodiments, an MAU also includes a set of ALUs (e.g., four ALUs) that perform arithmetic operations based on parameters specified by the header vectors and/or the match tables. The ALUs can store the result of their operations in stateful tables that they access and/or can write these results in the header vectors (e.g., directly, or by directing another action ALU to write these results in the header vectors) for other MAU stages to process.

In addition to the MAU stages, each ingress or egress pipeline includes a parser 630 and a deparser 634. A pipeline's parser 630 extracts a message header from a data message that the pipeline receives for processing. In some embodiments, the extracted header is in a format of a header vector (HV) that is processed, and in some cases modified, by successive message processing stages 632 as part of their message processing operations. The parser 630 of a pipeline passes the payload of the message to the deparser 634 as the pipeline's message-processing stages 632 operate on the header vectors. In some embodiments, the parser also passes the message header to the deparser 634 along with the payload (i.e., the parser passes the entire message to the deparser).

When a pipeline finishes processing a data message and the message has to be provided to the traffic manager (in case of an ingress pipeline) or to a port 615 (in case of an egress pipeline) to be forwarded to the message's next hop (e.g., to its destination compute node or next forwarding element), a deparser 634 of the pipeline in some embodiments produces the data message header from the message's header vector that was processed by the pipeline's last message processing stage, and combines this header with the data message's payload. In some embodiments, the deparser 634 uses part of the header received form the parser 630 to reconstitute the message from its associated header vector.

As shown in FIG. 6, one or more data plane components are configured to implement the heavy hitter detector 650. The HH detector 650 examines the header vector for each data message processed by the data plane to determine whether the data message is part of an HH flow. If so, it marks the data message's header vector so that one or more subsequent message-processing stages can perform an operation on the data message. As mentioned above, examples of such operations include (1) sending a mirrored copy of the data message to a server cluster or an appliance cluster in the network, (2) performing ECMP operation on the data message that breaks large HH flows into several smaller flows that take different equal cost paths to the large flow's destination, and (3) performing operations to mitigate the adverse effect of the large flows on other flows' completion time (e.g., by using techniques such as fair message drop, priority queuing etc.). They also include embedding this designation in the header of the data message before forwarding the data message to another forwarding element, end compute node (e.g., servers) or appliance that performs an operation on the data message based on the designation in its header.

This figure conceptually illustrates the component of the HH detector 650 has a statistics accumulator 652, a statistics storage 654, a statistics analyzer 656, a reset circuit 658 and a message designator 660. The statistics accumulator 652 in some embodiments increments the probabilistic statistical values maintained in the statistics storage 654 for each data message flow that the data plane processes. On the other hand, the statistics analyzer 656 compares the accumulated statistics with threshold value(s) to determine whether the processed data messages should be designated as being part of HH flows. When the analyzer 656 determines that the accumulated statistics for a data message exceeds a threshold value, the message designator 660 marks the header vector of the data message to indicate that it belongs to a HH flow.

In some embodiments, the stateful ALUs of at least two MAU stages accumulate and analyze the probabilistic statistical values for the data message flows in two sets of four stateful ALU tables, which are analogous to the first and second table sets 205 and 210 except that each set includes four stateful tables that are maintained by four stateful ALUs of an MAU stage. In other words, the statistics accumulator 652 and the statistics storage 654 in some embodiments are implemented by the stateful ALUs and stateful ALU tables of two MAU stages 632, while the statistics analyzer 656 is implemented by the action ALU of these two MAU stages.

Specifically, in some embodiments, each of the four stateful ALUs of each one of these two MAU stages accumulates probabilistic statistic values in its respective stateful table, and outputs the accumulated probabilistic statistic values to an action ALU in its MAU stage. For a data message, the action ALU of the MAU stage determines whether a threshold value is exceeded by each accumulated probabilistic statistic value that each of the four stateful ALUs outputs for the data message. If so, the action ALU of the MAU stage records a HH bit in the header vector of the data message, so that subsequent MAU stages can perform an operation on the data message based on this setting. This thresholding operation is an alternative way of performing the count-min sketch determination than the approach illustrated in FIG. 5. Specifically, instead of identifying the lowest statistical value and comparing this value to the threshold value, the action ALU of some embodiments ensures that all the outputted statistical values exceed the threshold value. If so, the lowest value necessarily exceeds the threshold value.

In some embodiments, the action ALU performs this thresholding operation when its MAU's statistic storage is operating in its read/write cycle. When the MAU's statistic storage operates in its write-only cycle or it is being reset, the action ALU in some embodiments does not perform its thresholding operation. Also, some embodiments embed the threshold value for a data message in the data message's header vector. For instance, some embodiments do not use one static threshold value for all data messages (e.g., all data messages in a flow) but adjust (e.g., increase) the threshold value with the passage of time during a read-write cycle of an MAU stage. As further described below by reference to FIG. 8, an earlier MAU stage in some of these embodiments computes the threshold value for a data message, and embeds this threshold value in the data message's header vector for subsequent processing by an MAU stage that implements the statistics analyzer 656 for that data message.

One of ordinary skill will realize that other embodiments implement the statistics accumulator 652, the statistics storage 654, and the statistics analyzer 656 differently in the data plane. For instance, other embodiments implement these components with different number of stages and/or with different numbers of stateful ALUs and stateful tables. Also, other embodiments implement the thresholding operation differently, e.g., have the stateful ALU of one stage implement both the statistics accumulator and analyzer, or have a stateful ALU or action ALU of another MAU implement the statistics analyzer.

The reset circuit 658 periodically resets each set of statistics collecting stateful ALU tables in order to ensure that the data stat collecting storage 654 does not become stale. As mentioned above, the stored probabilistic statistic values are only valid in the count-min sketch model for a short duration of time (e.g., for 2 ms). The message generator 635 in some embodiments is used to implement the reset circuit. Specifically, in some embodiments, the control plane 625 configures or directs the message generator 635 to periodically generate messages that direct an HHD-implementing MAU to reset the values stored in its stateful tables that stored the generated probabilistic statistical values. When multiple MAUs implement multiple different sets of statistics tables, the message generator in some embodiments generates different messages for different MAUs at different instances in time to ensure that no two MAUs that implement two different sets of tables reset their statistics tables at the same time. In some embodiments, the messages generated by the message generator 635 are processed by the ingress and egress pipelines in the same way as the messages that the forwarding element receives through its ports 612.

Figure 7:
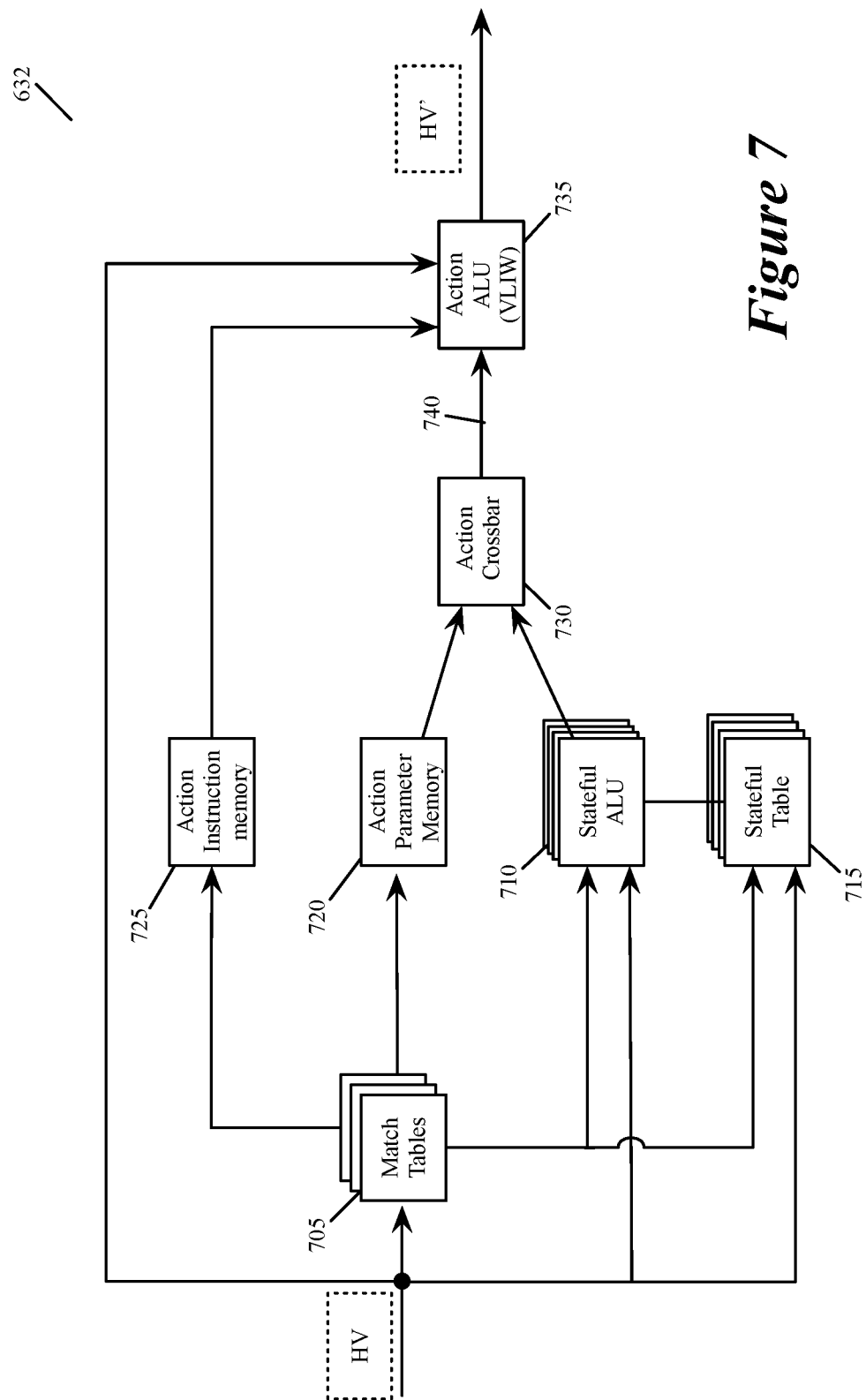
FIG. 7 illustrates examples of stateful memories and processing units that some embodiments use in a match action unit to implement the various components of the HH detector.

FIG. 7 illustrates examples of stateful memories and processing units that some embodiments use in a match action unit 632 to implement the various components of the HH detector 650. As mentioned above, an ingress pipeline 640 or egress pipeline 642 in some embodiments has several MAU stages 632, each of which includes message-processing circuitry for forwarding received data messages and/or performing stateful operations based on header vectors associated with the data message. In some embodiments, the control plane 625 of the forwarding element 600 or a remote control plane configures the MAU stages 632 of the data plane 620 to implement not only the forwarding operations of these MAU stages, but also the HH detection operations that some of the MAU stages 632 perform. These operations are performed by processing values stored in the header vectors that are generated for the data messages.

The stateful operations of the data plane are enabled by the data plane's ability to store data that it generates from processing earlier data messages for processing subsequent data messages. To perform stateful HH detection operations, the HHD-implementing MAU stages 632 in some embodiments use their stateful ALUs 710 and their associated stateful tables 715, as shown in FIG. 7.

In addition to the stateful ALUs 710 and stateful tables 715, the MAU stage 632 in some embodiments has a set of one or more match tables 705, an action crossbar 730, an action parameter memory 720, an action instruction memory 725, and an action ALU 735. The match table set 705 can compare one or more fields in a received message's header vector to identify one or more matching flow entries (i.e., entries that match the message's HV). The match table set 705 can include TCAM tables or exact match tables in some embodiments. In some embodiments, the match table set can be accessed at an address that is a value extracted from one or more fields of the message's header vector, or it can be a hash of this extracted value. In some embodiments, the local control plane or a remote-control plane supplies flow entries (e.g., the flow-match identifiers and/or action identifiers), to store in one or more match tables and associated action tables.

In some embodiments, the value stored in a match table record that matches a message's flow attributes, or that is accessed at a hash-generated address from one or more message flow attributes, provides addresses of records to access in the action parameter memory 720 and action instruction memory 725. The actions performed by the MAU stage 632 can include actions that the forwarding element has to perform on a received data message to process the data message (e.g., to drop the message, or to forward the message to its destination machine or to other intervening forwarding elements).

Also, in some embodiments, the value stored in a match table record that matches a message's flow identifier, or that is accessed at a hash-generated address, can provide an address and/or parameter for one or more records in the stateful table set 715, and can provide an instruction and/or parameter for the set of stateful ALUs 710. As shown, the stateful ALUs 710 and the stateful tables 715 also receive a processed message's header vector. The header vectors can include instructions and/or parameters for the stateful ALUs, while containing addresses and/or parameters for the stateful tables 715.

The stateful ALUs 710 in some embodiments performs one or more stateful operations, while stateful tables 715 store state data used and generated by the stateful ALUs 710. In some embodiments, the stateful ALUs performs operations synchronously with the data flow of the message-processing pipeline (i.e., synchronously at the data line rate of the data plane 620). As such, the stateful ALUs can process a different header vector on every clock cycle, thus ensuring that the stateful ALUs would be able to operate synchronously with the dataflow of the message-processing pipeline.

In some embodiments, the local or remote control plane provides configuration data to program the stateful ALUs 710 of the MAUs 632 of the data plane 620. The stateful ALU 710 outputs an action parameter to the action crossbar 730. The action parameter memory 720 also outputs an action parameter to this crossbar 730. The action parameter memory 720 retrieves the action parameter that it outputs from its record that is identified by the address provided by the match table set 705. The action crossbar 730 in some embodiments maps the action parameters received from the stateful ALUs 710 and action parameter memory 720 to an action parameter bus 740 of the action ALU 735. This bus provides the action parameter to this ALU 735. For different data messages, the action crossbar 730 can map the action parameters from stateful ALUs 710 and memory 720 differently to this bus 740. The crossbar can supply the action parameters from either of these sources in their entirety to this bus 740, or it can concurrently select different portions of these parameters for this bus.

The action ALU 735 also receives an instruction to execute from the action instruction memory 725. This memory 725 retrieves the instruction from its record that is identified by the address provided by the match table set 705. The action ALU 735 also receives the header vector for each message that the MAU processes. Such a header vector can also contain a portion or the entirety of an instruction to process and/or a parameter for processing the instruction.

The action ALU 735 in some embodiments is a very large instruction word (VLIW) processor. The action ALU 735 executes instructions (from the instruction memory 725 or the header vector) based on parameters received on the action parameter bus 740 or contained in the header vector. The action ALU stores the output of its operation in the header vector in order to effectuate a message forwarding operation and/or stateful operation of its MAU stage 632. The output of the action ALU forms a modified header vector (HV') for the next MAU stage or the deparser. In some embodiments, examples of such actions include designating a processed data message as being part of a HH flow.

In other embodiments, the match tables 705 and the action tables 715, 720 and 725 of the MAU stage 632 can be accessed through other methods as well. For instance, in some embodiments, each action table 715, 720 or 725 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 705. As in the case of a match table 705, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 705 for a message's header vector. As mentioned above, the match table records are identified through direct addressing or record matching operations in some embodiments.

The independent address scheme is similar to the direct addressing scheme except that it does not use the same address that is used to access the match table set 705. Like the direct addressing scheme, the table address in the independent addressing scheme can either be the value extracted from one or more fields of the message's header vector, or it can be a hash of this extracted value. In some embodiments, not all the action tables 715, 720 and 725 can be accessed through these three addressing schemes, e.g., the action instruction memory 725 in some embodiments is accessed through only the direct and indirect addressing schemes. Also, other addressing schemes are used to address some of the tables (e.g., action tables).

As mentioned above, the stateful ALUs 710 of at least two MAU stages 632 accumulate and analyze the probabilistic statistical values for the data message flows in their respective stateful ALU tables 715. Based on a hash address value generate by a hash generator (not shown) of its MAU, each stateful ALU 710 of each HHD-implementing MAU stage accumulates probabilistic statistical values in its respective stateful table 715, and outputs the accumulated probabilistic statistical values to its action ALU 735 in its MAU stage. For a data message, the action ALU 735 determines whether a threshold value is exceeded by each accumulated probabilistic statistic value that each of the four stateful ALUs 710 outputs for the data message. If so, the action ALU records an HH bit in the header vector of the data message, so that subsequent MAU stages can perform an operation on the data message based on this setting. As mentioned above, the action ALU performs this thresholding operation in some embodiments only when its MAU's stateful tables 715 operate in their read/write cycle (i.e., does not perform its thresholding operation when the stateful tables 715 operate in their write-only cycles or they are being reset).

Figure 8:
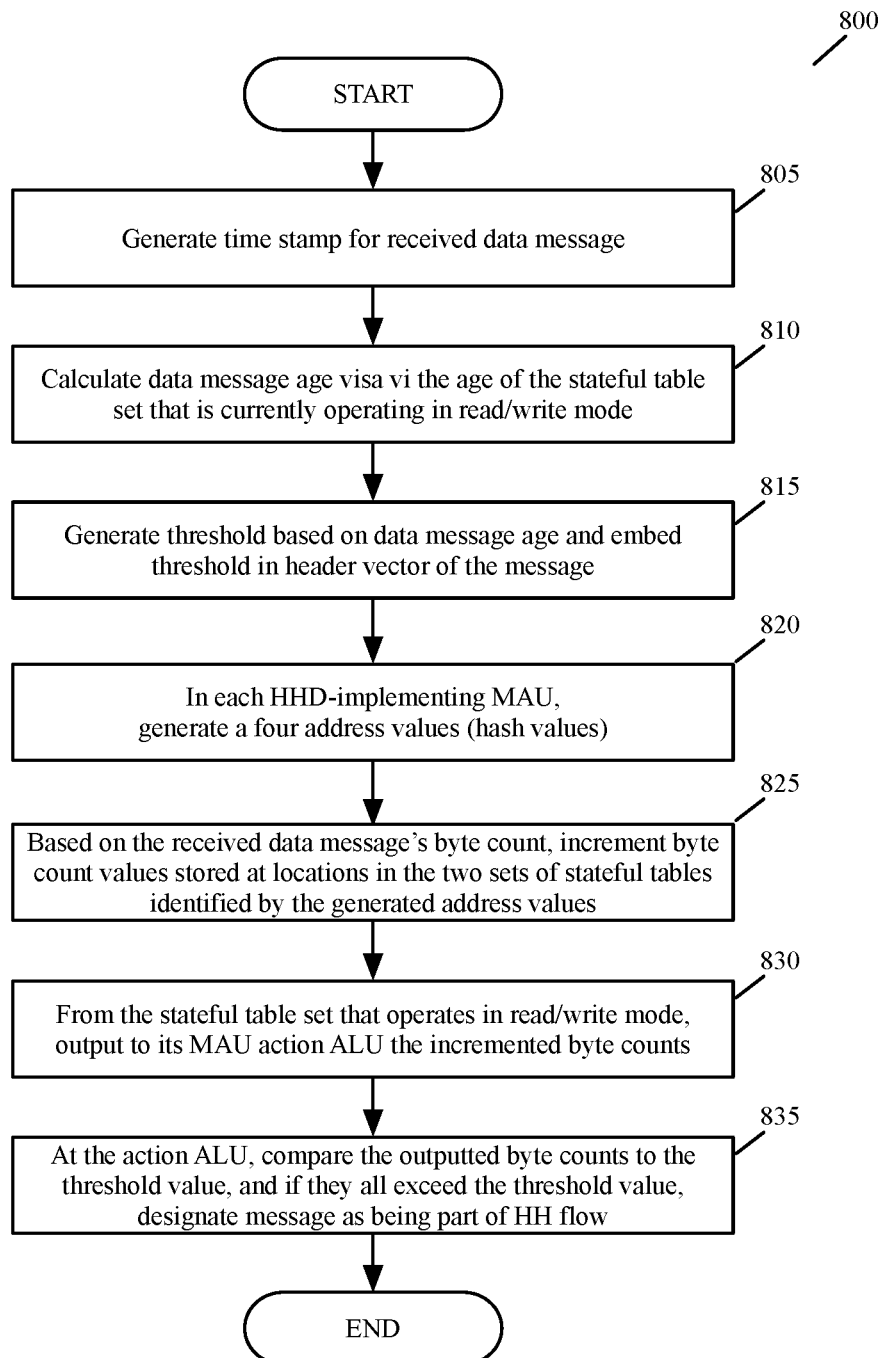
FIG. 8 provides a conceptual illustration of a process that an HH-detector in some embodiments.

FIG. 8 conceptually illustrates a process 800 that the HH-detector 650 performs in some embodiments. In some embodiments, the process 800 is performed for each received data message that is processed by the data plane 620. As shown, the data plane 620 initially generates (at 805) an ingress time stamp to specify the time at which the data message was received by the forwarding element or by an ingress pipeline. In some embodiments, this time stamp might be truncated to quantize (i.e., lower the resolution of) the processed time stamp values.

Next, at 810, a module in the data plane (e.g., an MAU stage) computes an age value for the received data message. In some embodiments, the age value is dependent on the age of the stateful table set that is currently operating in its read/write mode (i.e., the duration of time that has passed since the last instance at which this stateful table set was reset). For instance, this age is computed as the difference between the time stamp and the time of the last reset of the stateful table set that is currently operating in its read/write mode.

At 815, the process 800 dynamically specified a threshold value for the received data message. To do this, the MAU that computes the message age, in some embodiments uses the computed age to look-up (i.e., retrieve) a threshold value from a look-up table that specifies different threshold values for different age ranges. The control plane configures the MAU stage with this look-up table in some embodiments. This MAU stage then writes (at 815) the identified threshold value in the header vector of the message.

Each HHD-implementing MAU has one or more hash generators that generate (at 820) four hash values that specify four address locations in the four stateful tables 715 of that MAU. At 825, the four stateful ALUs 710 of each HHD-implementing MAU increment the byte count stored at the four locations identified in the four stateful tables 715, and read back the incremented byte count values. Each such MAU performs the operations 820 and 825 when the header vector of the received data message reaches that MAU. In other words, even though FIG. 8 illustrates both of HHD-implementing MAUs operations together, one of ordinary skill will realize that this is just a conceptual representation that is meant to simplify the illustration of the operations of the process 800.

The byte count values that are read back from the stateful table set 715 that operates in its read/write mode are supplied (at 830) to its corresponding action ALU 735, which then compares (at 835) each of these values with the message's threshold value that is obtained from its header vector. When all of these values exceed the threshold value, the action ALU stores (at 835) a bit in the header vector to indicate that the data message belongs to a HH flow. After 835, the process ends.

As mentioned above, HH designation in a data message's header vector is used by one or more subsequent message-processing stages of the data plane 620 to perform one or more operations on the data message. These operations include (1) sending a mirrored copy of the data message to a server cluster or an appliance cluster in the network, (2) performing ECMP operation on the data message that breaks large HH flows into several smaller flows that take different equal cost paths to the large flow's destination, (3) performing operations to mitigate the adverse effect of the large flows on other flows' completion time. Examples of operations that can be performed to mitigate adverse effect of HH flows include the traffic manager 644 dropping messages from HH flows in order to reduce the chances that smaller flows are dropped by the traffic manager. Conversely, the HH designation can be used to ensure that certain HH flows are provided priority forwarding over other flows.

The HH designation in the data message's header vector can also result inserting an HH designation in the data message's header before forwarding the data message to another forwarding element, end compute node (e.g., servers) or appliance that performs an operation on the data message based on the designation in its header. For instance, the forwarding element or appliance (in the intervening network fabric 610 after the forwarding element 600) that receives the data message with the HH designation can use fair message drops or priority queuing based on the HH designation of the data message in order to ensure that the HH data messages do not result in excessive drops of data messages of smaller flows. Alternatively, the forwarding element or appliance that receives the data message with the HH designation can use this designation to ensure that certain HH flows are provided priority forwarding over other flows.

One such forwarding operation that such a forwarding element or appliance performs in some embodiments based on the HH designation in the data message's header is to select a path to the message's destination as part of an ECMP operation that the forwarding element or appliance performs to break an HH flow into smaller flows that take different paths to the destination of the HH flows. Today, numerous techniques are defined for breaking a larger flow into smaller flows that take different paths to the destination of the larger flow. Some of these techniques produce slightly different header values (e.g., source ports) for the smaller flows from the larger flow's header in order to ensure that the smaller flows are forwarded by intervening network forwarding elements along different paths to the larger flow's destination.

Figure 9:
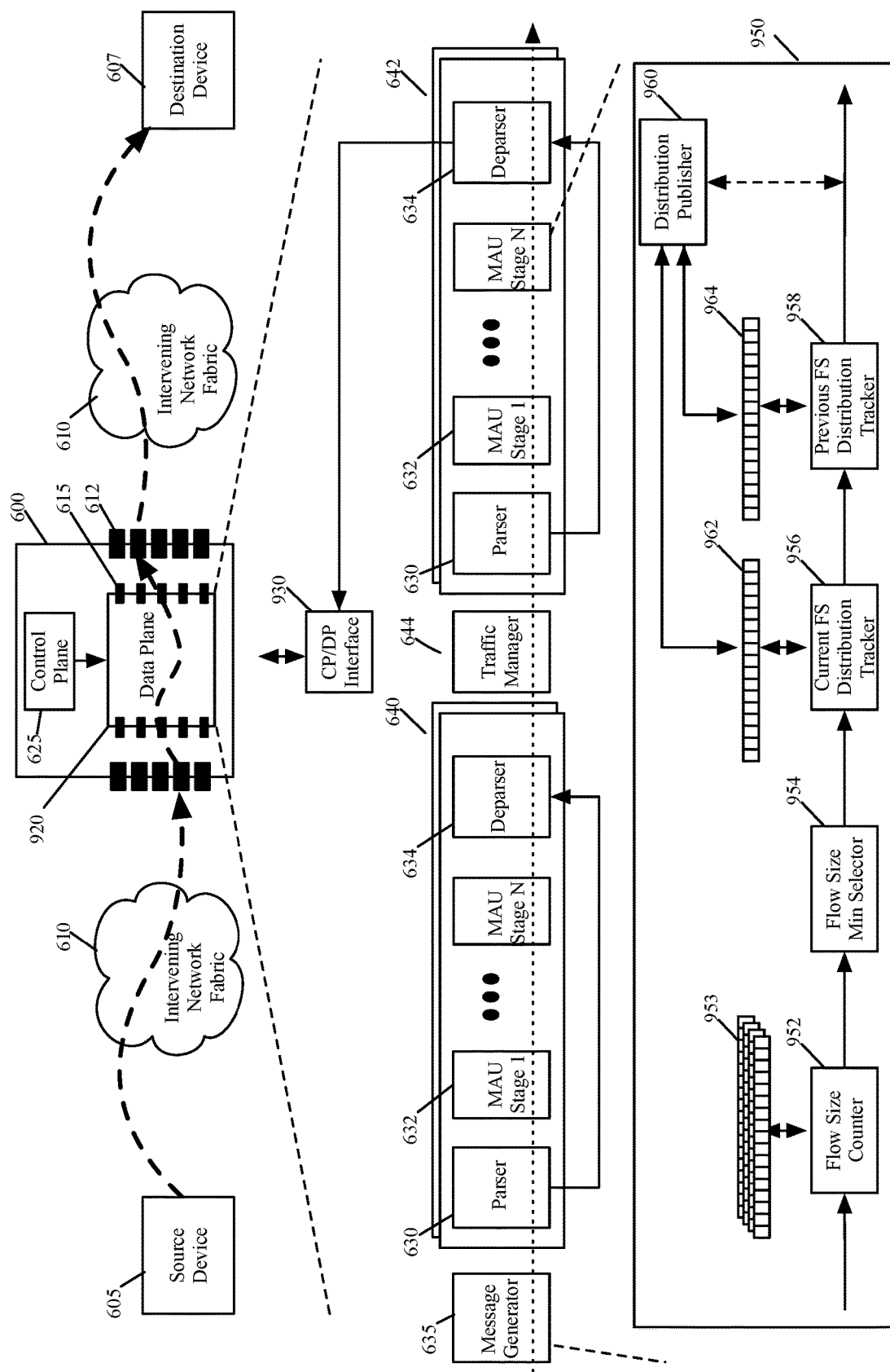
FIG. 9 illustrates an example of a data plane that can be configured to implement a FS detection circuit.

In addition to, or instead of, implementing an HH detection circuit in the data plane, the network forwarding element of some embodiments implements a flow-size (FS) detection circuit that generates flow-size density distribution for some or all of the data message flows that it processes for forwarding in a network. FIG. 9 illustrates an example of a data plane 920 that can be configured to implement a FS detection circuit 950 of some embodiments of the invention. The data plane 920 of FIG. 9 is identical to the data plane 620 of FIG. 6 except that its programmable stages are configured to implement an FS detection circuit 950 in addition to or instead of an HHD circuit 650. As such, the data plane 920 is shown to be part of the same forwarding element 600 of FIG. 6, which forwards, as mentioned above, data messages between data message source and destination devices (such as devices 605 and 607).

As shown, the forwarding element 600 has (1) a data plane 920 that performs the forwarding operations of the forwarding element 600 to forward data messages received by the forwarding element to other devices, and (2) a control plane 625 that configures the programmable stages (e.g., MAU stages 632) of the data plane to perform its operations (e.g., its forwarding operations, its FS detection operations, its HHD operations, etc.). In some embodiments, the data plane 920 is implemented by an ASIC on which the message processing pipeline 640/642 and the traffic manager 644 are defined, while the control plane 625 is implemented by one or more memories that store control plane instructions and one or more general purpose processors that execute the control plane instructions.

Like data plane 620, the data plane 920 has several ingress and egress pipelines 640 and 642 with several data message processing stages 632 that are configured to process the data tuples (e.g., header vectors) associated with the data messages received by the data plane, in order to forward the data messages. The traffic manager 644 serves as a crossbar switch that directs messages from the ingress pipelines to egress pipelines. Each ingress or egress pipeline has (1) a parser 630 that extracts a message header from a data message that the pipeline receives for processing, and (2) a deparser 634 that reconstitutes the data message from the message's last processed header vector (i.e., the header vector processed by the pipeline's last message processing stage) and the data message's payload.

In some embodiments, the deparser 634 uses part of the header received form the parser 630 to reconstitute the message from its associated header vector. FIG. 9 illustrates the connection between the deparsers 634 of the egress pipelines 642 and a control/data plane interface 930 of the data plane 920. Through this interface 930, the control plane 625 can access resources (e.g., registers, memories, etc.) in the data plane 920, and the data plane 920 can provide data to the control plane, as further described below.

FIG. 9 illustrates that some of the data plane message-processing stages are configured to implement a flow-size detection circuit 950 in some embodiments. In other embodiments, the data plane has a dedicated flow-sized detection circuit that does not use re-purposed message processing stages for flow-size detection operations. The FS detection circuit 950 in some embodiments collects statistics regarding the data message flows processed by the data plane 920, and based on the collected statistics, it generates a FS density distribution (FSDD) that expresses a number of flows in different flow-size sub-ranges in a range of flow sizes.

As shown, the FS detection circuit 950 includes a flow-size counter 952, flow-size registers 953, a flow-size min selector 954, a current FS distribution tracker 956, a current FSDD register 962, a previous FS distribution tracker 958, a previous FSDD register 964, and a FS distribution publisher 960. The flow-size counter 952 in some embodiments generates statistical values regarding the data message flows processed by the data plane 920. Based on these statistical values, current and previous FS distribution circuits 956 and 958 generate FSDDs and store these FSDDs in the FSDD registers 962 and 964. Each of these registers 962 and 964 has several cells with each cell corresponding to a different sub-range of FS values.

The density distributions stored in these registers are probabilistic density distributions as they are based on probabilistic statistical values that the flow-size counter 952 generates for the data message flows that are processed by the data plane 920, and stores in FS registers 953. In some embodiments, the FS counter 952 is similar to the stat accumulator 652 of FIG. 6. As described by reference to FIGS. 1-8, the stat accumulator (e.g., the FS counter 952) generates probabilistic statistical values for the processed data message flows by generating hash values from header values of the data message flows and accumulating flow-size values at memory locations (e.g., cells of FS register 953) identified by the generated hash values. In some embodiments, the generated hashes for two different data message flows can collide, and this would result in the flow size counts for the two flows to accumulate in the same cell of the FS count register 953. Thus, undesirable hash collisions can introduce errors in the collected statistics, which is the reason why the collected flow-size counts are probabilistic values that can have a certain level of inaccuracy.

The density distribution that the FS detection circuit 950 produces is a FSDD that is defined over a programmable period of time. For instance, the flow-size detection circuit 950 produces a first FSDD that expresses a number of processed flows in the different flow-size sub-ranges during a first time period, and then produces a second FSDD that expresses a number of flows in the different flow-size sub-ranges during a second time period.

To produce the FSDD for a particular time period, the FS detection circuit uses the current and previous FS distribution trackers 956 and 958. For each currently processed message of each particular message flow, the current distribution tracker 956 updates the current FSDD register 962 based on a flow size (including the current message's payload size) that the FS detection circuit 950 has computed for the particular message flow in the particular time period. For each currently processed message, the previous FS distribution tracker 958, on the other hand, maintains an FSDD for previously processed messages. This tracker 958 updates, for each message processed during the particular time period, the second FSDD register 964 in order to negate redundant updates to the FSDD register 962 for multiple messages for each processed message flow during the particular time period.

More specifically, to update the first FSDD register 962 for a particular time period for a current message that is part of a particular data message flow, the first distribution tracker 956 increments by one the value stored in the first FSDD register cell that corresponds to a first flow size that the FS detection circuit 950 currently maintains for the particular message flow in the particular time period. The first flow size includes the payload size of the current message. As mentioned above, the FS counter 952 computes and stores multiple probabilistic flow size values in multiple cells of FS registers 953 for each current message that it processes. The FS counter outputs these multiple FS values to the min selector 954, which then selects and outputs the smallest FS value that it receives as the current probabilistic flow size that the FS detection circuit 950 currently has for the particular message flow in the particular time period after processing the current message.

During the particular time period, the FS detection circuit 950 might process more than one message of a particular message flow. For each of these messages, the current distribution tracker 956 updates the current FSDD in the current FSDD register 962. Each update after the first one for a particular message flow in a particular time period is redundant, except for when a subsequent update increments a subsequent register cell that is associated with a subsequent FS range to indicate that the flow size of the particular data message flow has gone from one FS sub-range to another FS sub-range.

Hence, to account for multiple redundant updates to the current FSDD register 962 for one particular data message flow during a particular time period, the FS detection circuit 950 uses the previous distribution tracker 958. To update the previous FSDD register for the current message, the previous distribution tracker 958 increments by one the value stored in the previous FSDD register cell that corresponds to a flow size that is computed by subtracting the current message's payload size from the flow size that the min FS selector 954 outputs for the current message (i.e., that corresponds to the flow size that the FS detection circuit 950 maintained for the particular message flow before the processing of the current message).

As further described below by reference to FIGS. 11-13, the FSDD for the particular time period is the current FSDD of the current FSDD register 962 minus the previous FSDD of the previous FSDD register 964. Hence, the update to the previous FSDD based on the current message is designed to remove from the current FSDD, for the particular time period, any previous contribution of any prior message of the particular data message flow to the current FSDD.

The FS distribution publisher 960 conceptually represents the data plane circuitry that provides the FSDD for a particular time period to the local control plane 625, to a remote control plane or to an external server. This publisher is implemented differently in different embodiments. In some embodiments, the control plane 625 of the forwarding element 900 retrieves the FSDD for a particular time period through the control plane interface 930. Conjunctively, or alternatively, the data plane's message generators 635 in some embodiments generate data messages that the data plane 920 processes so that the FS detection circuit 950 can then populate with the FSDD that it has generated for a particular time period.

The deparsers 634 of the egress pipelines 642 of the data plane can then forward these FSDD-populated data messages in some embodiments to the forwarding element's control plane 625 by directing these messages to a data plane port 615 that forwards the data messages to the control plane interface 930. Alternatively, or conjunctively, the egress-pipeline deparsers 634 can direct an FSDD-populated data message to the data-plane egress port 615 corresponding to the forwarding-element port 612 that is associated with an external machine (e.g., an external server), so that the FSDD-populated data messages can be sent to the external machine through a direct connection between the machine and the forwarding-element port or through an intervening network.

FIG. 9 illustrates one current FSDD register 962 and one previous FSDD register 964. In some embodiments, however, the FS detection circuit 950 has multiple current FSDD registers (e.g., 16 registers) and multiple previous FSDD registers (e.g., 16 registers). The current and previous distribution trackers 956 and 958 of this FS detection circuit 950 use each pair of current/previous FSDD registers to store the current/previous FSDDs for a different particular time period. Each of these time periods is referred to as an epoch in the discussion below. In these embodiments, each set of current or previous FSDD registers operate as a circular set of registers, whereby after the storage of a computed FSDD in the last register in the set, the next computed FSDD is stored in the first register in the set. For instance, when 16 pairs of registers are used, the distribution trackers 956 and 958 store up to 16 pairs of current/previous FSDDs for 16 successive epochs (i.e., time periods) in some embodiments. After storing the sixteenth FSDD in its sixteenth register, the distribution tracker 956 or 958 stores the next FSDD in the first register.

In some embodiments, the FS detection circuit 950 generates and maintains records for multiple FSDDs. The local control plane 625 in some embodiments retrieves several of these FSDDs through the control plane interface 930 and/or receive several FSDDs through FSDD-populated data messages that the data plane generates and forwards to the control plane interface 930. Similarly, in some embodiments, one or more FSDD-populated data messages can send to an external machine several FSDDs that are maintained by the data plane at any given time.

Figure 10:
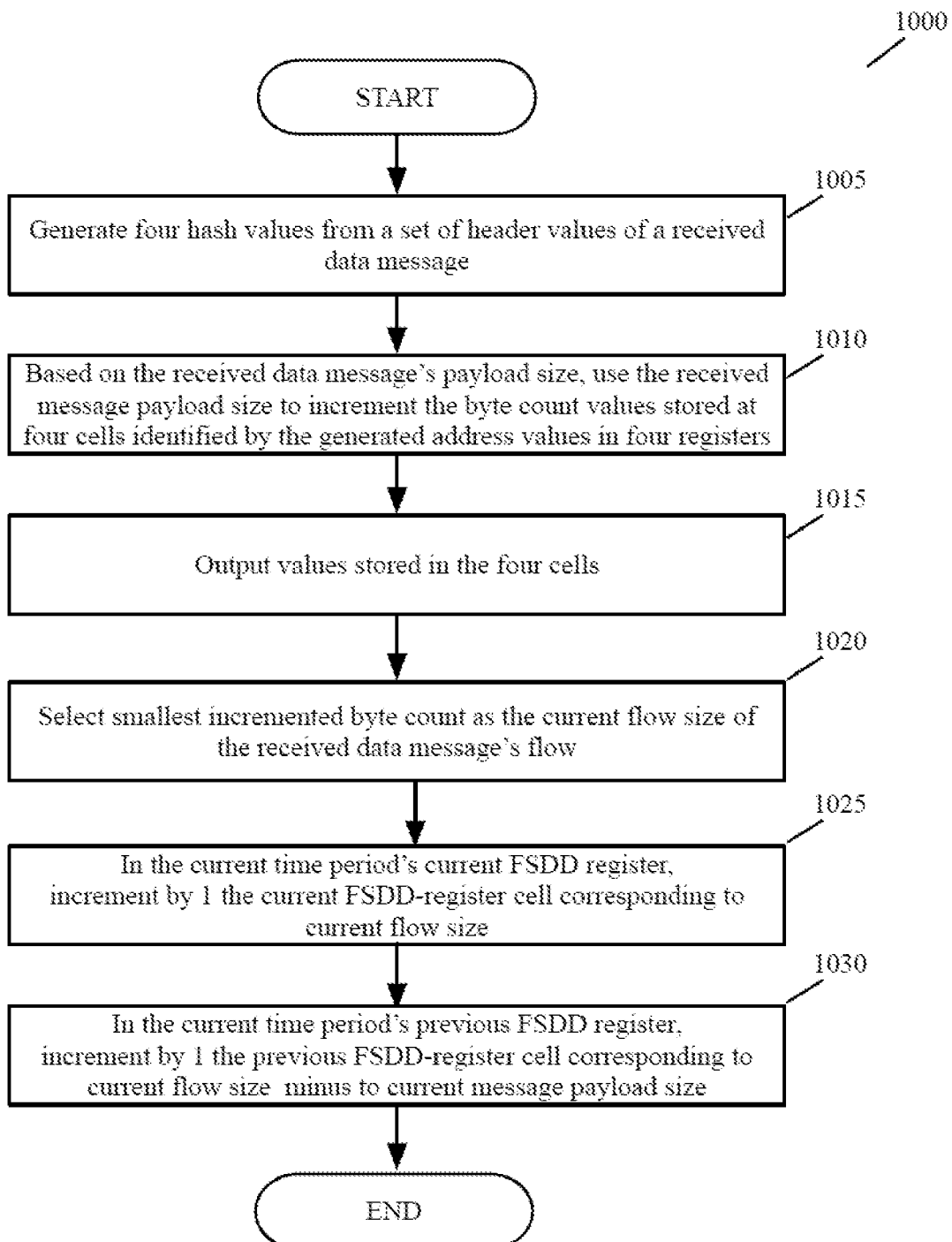
FIG. 10 illustrates a process that a FS detection circuit performs in some embodiments to process a data message that the data plane receives.

FIG. 10 illustrates a process 1000 that the FS detection circuit 950 performs in some embodiments to process a data message that the data plane 920 receives. This process 1000 will be explained by reference to FIGS. 11-13, which show the operations that the FS detection circuit 950 performs for the first three data messages processed in one epoch. As shown, the FS counter 952 initially generates (at 1005) four hash values from a set of header values (e.g., L2, L3 and/or L4 header values) of the received data message. In some embodiments, the four hash values are generated by four different hash generators, while in other embodiments, the four hash values are four parts of one or two hash values generated by one or two hash generators.

Next, at 1010, the FS counter 952 uses the received message's payload size to increment the byte count values stored at four count-register cells (in four byte-count registers) identified by the four addresses specified by the four generated hash values. FIG. 11 illustrates an example of FS counter 952 using the payload size of 20 KB to update the value of four cells in four registers 1102-1108 for a first packet that the FS counter processes in an epoch. This first packet is packet 1 of flow A in this example. In some embodiments, the FS counter 952 uses different sets of registers (e.g., odd and even sets of registers) for different epochs (e.g., odd and even epochs) so that it can reset one set of registers that were used in the previous epoch while using another set of registers (that were previously reset) for the current epoch. This is similar to the approaches described above by reference to FIGS. 1-5.

In other embodiments, the FS counter 952 only uses one set of registers (e.g., a set of four registers 1102-1108) to maintain the byte counts for all epochs. Given that the FS counter should not use the byte counts of an earlier epoch for a later epoch, the FS counter maintains a time stamp for each cell of each register to identify the last time that it updated the cell. Each time the FS counter 952 has to increment the byte count of a cell with the current message's payload size, this counter first checks the time stamp for the cell. When the time stamp for the cell is associated with an earlier epoch (i.e., is not associated with the current epoch), the FS counter sets the value of the cell to the current message's payload size (i.e., discards any non-zero value that was stored at this location). On the other hand, when the time stamp for the cell is associated with the current epoch, the FS counter adds the current message's payload size to the value that is currently stored in this cell.

At 1015, the FS counter 952 outputs the four values of the four cells incremented at 1010. Next, at 1020, the FS min selector 954 selects the smallest byte count value that was output at 1015. The smallest byte count is the value that should be least affected by hash collisions as it is least likely that all four cells identified by hashing the received message's flow identifier (i.e., the received message's set of header values) would have also been identified by hashes of header values of other message flows. In the example illustrated in FIG. 11, the FS min selector 954 outputs 20 KB, as all of the four cells store 20 KB.

At 1025, the current FS distribution tracker 956 increments by 1 the cell in the current FSDD register 962 that corresponds to the FS value output by the FS min selector 954. In the example of FIG. 11, this cell is the first cell, as each cell corresponds to a 50 KB increment. Hence, FIG. 11 shows a value 1 stored in the first cell of the current FSDD register 962. The rest of the values in this register are zero as the packet 1 of flow A is the first message processed in the current epoch.

Next, at 1030, the previous FS distribution tracker 956 increments by 1 the cell in the previous FSDD register 964 that corresponds to the flow size value that is derived by subtracting the current message's payload size from the FS value output by the FS min selector 954. In FIG. 11, no value is incremented in the previous FSDD register 964 as the flow size minus packet size is zero (because the flow size equals the current message's packet size given that packet 1 of flow A is the first packet being processed for flow A in this epoch). After 1030, the process ends.

As mentioned above, the difference between the current FSDD stored in the current FSDD register 962 and the previous FSDD stored in the previous FSDD register 964 is the FSDD that the FS detection circuit 950 produces for a current epoch. To illustrate this, FIGS. 12 and 13 show the processing of the next two packets in the same epoch as FIG. 11. FIG. 12 shows that the second packet in this epoch is packet 1 of flow B. This packet has a payload size of 10 KB.

From the set of header values of the packet 1 of flow B, the FS counter generates four hash values that identify four cells in the four registers 1102-1108. The second hash value that is generated for this packet is identical to the second hash value that is generated for packet 1 of flow A, and hence identifies the same cell in the second register 1104. In other words, the hashes for the flows A and B collide in one of the addressed cells, i.e., the cell of the second register 1104.

After identifying the four cells, the FS counter increments the byte counts in these cells by the payload size of packet 1 of flow B. As shown, the addressed cells in the first, third and fourth registers are set to 10 KB as these cells previously stored 0, while the addressed cell in the second register 1104 is set to 30 KB as this cell previously stored 20 KB. The FS counter outputs the values of these four cells, and the min selector picks 10 KB as the current flow size for the current packet's (packet 1's) flow size.

The current FS distribution tracker 956 then increments by 1 the value stored in the cell of the current FSDD register 962 that corresponds to the flow size output by the min selector. As this value is 10 KB and the first cell of the current FSDD register 962 corresponds to this value, the value of this cell is incremented from 1 to 2. As in FIG. 11, no value is incremented in the previous FSDD register 964 in FIG. 12, as the flow size for flow B minus the packet size of packet 1 of flow B is zero (because the flow size equals the current message's packet size given that packet 1 of flow B is the first packet being processed for flow B in this epoch).

Figure 13:
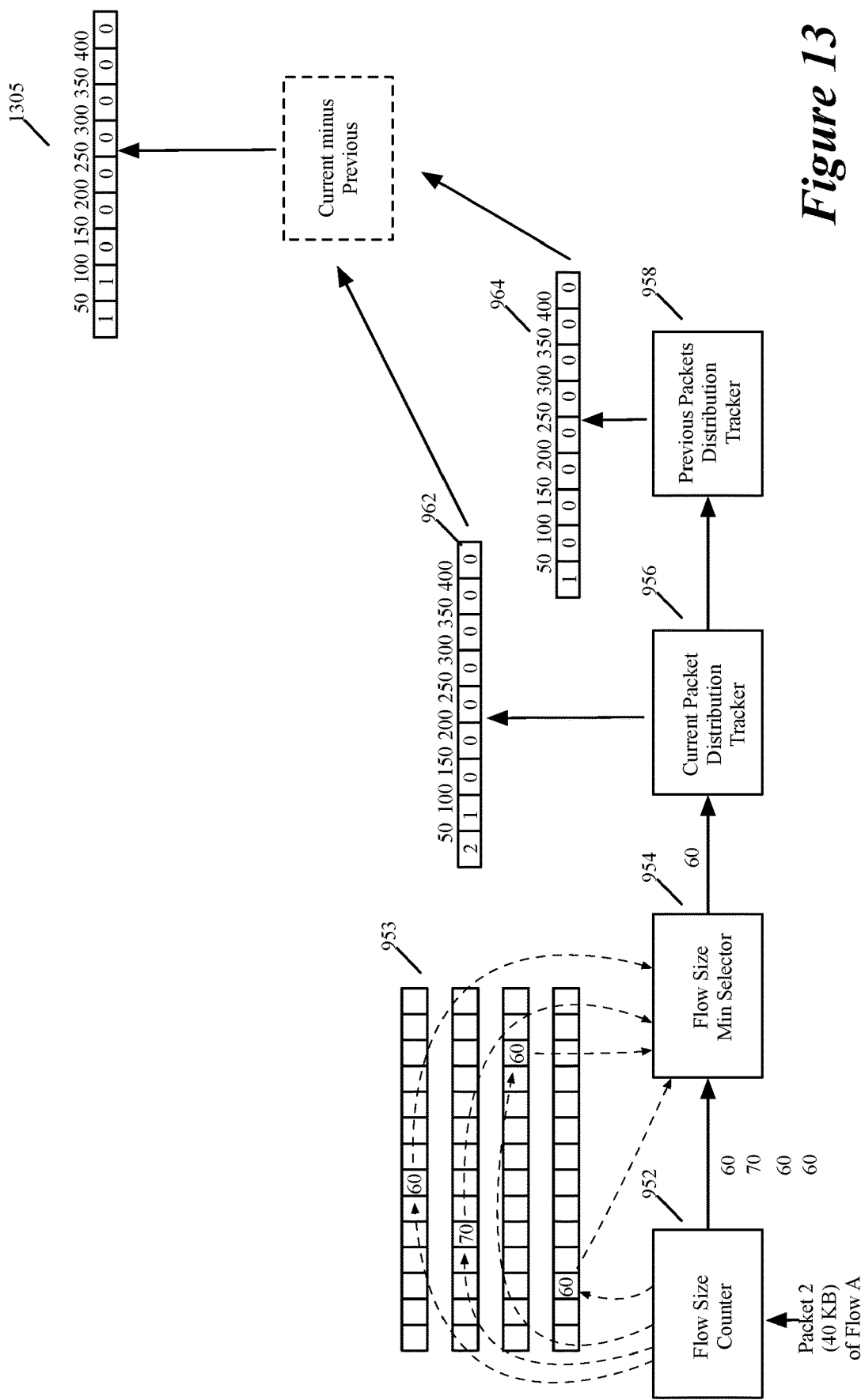

FIG. 13 shows that the third packet in the epoch is packet 2 of flow A. This packet has a payload size of 40 KB. From the set of header values of this packet, the FS counter generates four hash values that identify the same four cells as it identified for the first packet of flow A in FIG. 11. Again, there is a hash collision between flows A and B in the second register 1104.

After identifying these four cells, the FS counter increments the byte counts in these cells by the payload size of packet 2 of flow A. As shown, the addressed cells in the first, third and fourth registers are set to 60 KB after this operation, while the addressed cell in the second register 1104 is set to 70 KB. The FS counter outputs the values of these four cells, and the min selector picks 60 KB as the current flow size for the current packet's flow size.

The current FS distribution tracker 956 then increments by 1 the value stored in the cell of the current FSDD register 962 that corresponds to the flow size output by the min selector. As this value is 60 KB and the second cell of the current FSDD register 962 corresponds to the flow size range from 50-100 KB, the value of the second cell is incremented from 0 to 1. Also, as the current flow size is 60 KB while the current packet's payload size is 40 KB, the second FS distribution tracker 958 increments by 1 the value stored in the cell of the previous FSDD register 964 that corresponds to 20 KB (i.e., the current flow size minus the current packet's payload size).

FIG. 13 shows that the current FSDD stored in the current FSDD register 962 minus the previous FSDD stored in the previous FSDD register 964 results in an overall FSDD 1305 that shows that the FS detection circuit 950 currently has collected two flow sizes for two flows, one with a flow size in the range of 0 to 50 KB (i.e., flow B) and another with a flow size in the range of 50 to 100 KB (i.e., flow A). This subtraction is illustrated with dash lines as it can be performed in the data plane, in the local/remote control plane, or in a remote machine. In this subtraction, each previous density value (for each density sub-range) in the previous FSDD is subtracted from the corresponding current density value (for the corresponding density sub-range) in the current FSDD.

This subtraction removes the earlier contribution to the first cell of the current FSDD register 962 by the packet 1 of flow A, in order to ensure that the same flow does not increment multiple different sub-ranges (i.e., multiple different FSDD register cells) in the FSDD that is generated by the FS detection circuit for the current epoch. In other words, the value stored in the first cell of the previous FSDD register once subtracted from the first cell of the current FSDD register removes the previous contribution to the first cell of the current FSDD register by packet 1 of flow A. This removal is needed because once packet 2 of flow A is processed, the flow size that is maintained for this flow passes from the first sub-range associated with the first cell of the current cell register to the second sub-range associated with the second cell.

Figure 14:
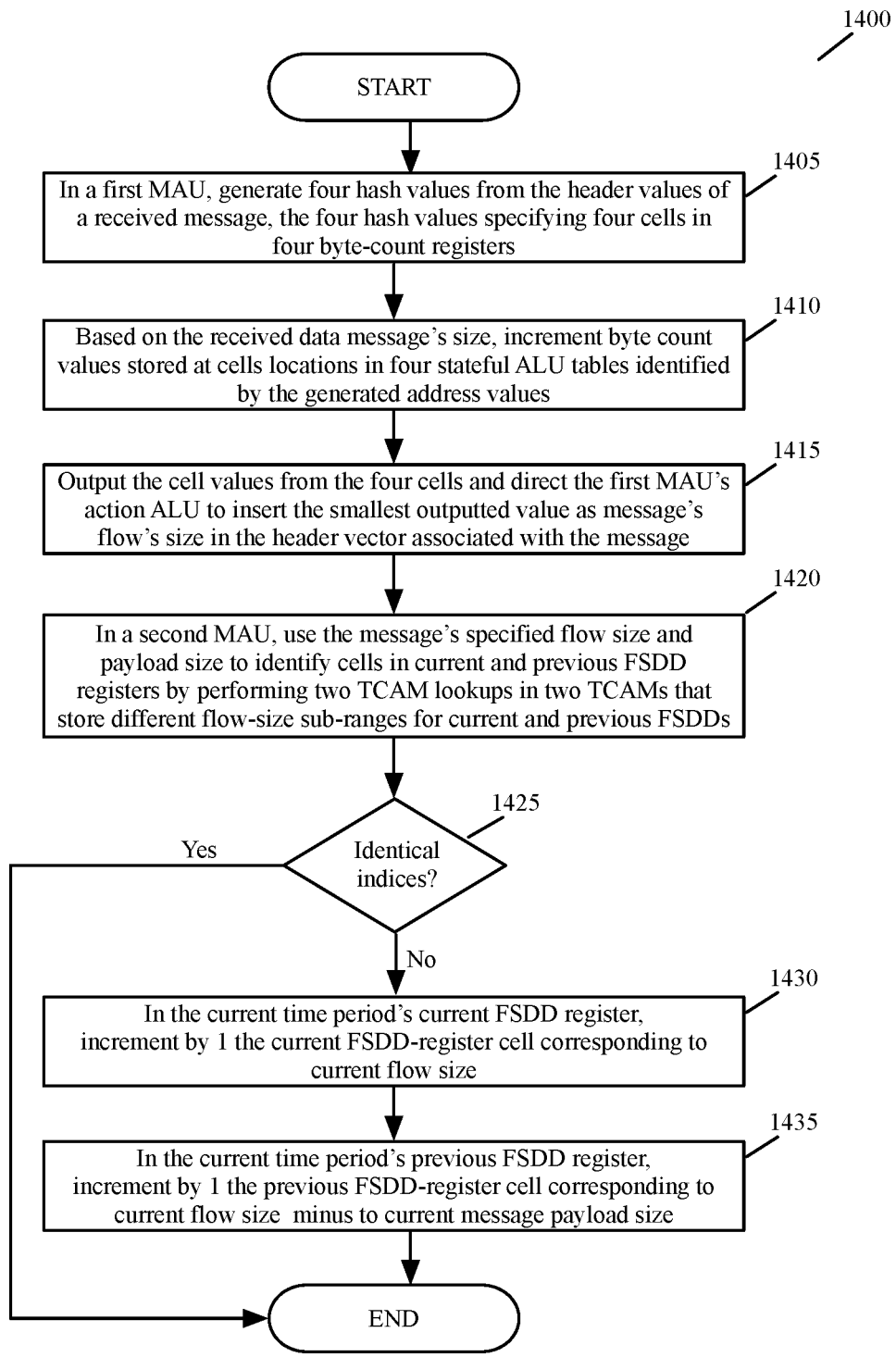
FIG. 14 illustrates a process that shows how the FS detection circuit is implemented by two match-action unit (MAU) stages of a data plane in some embodiments.
Figure 15:
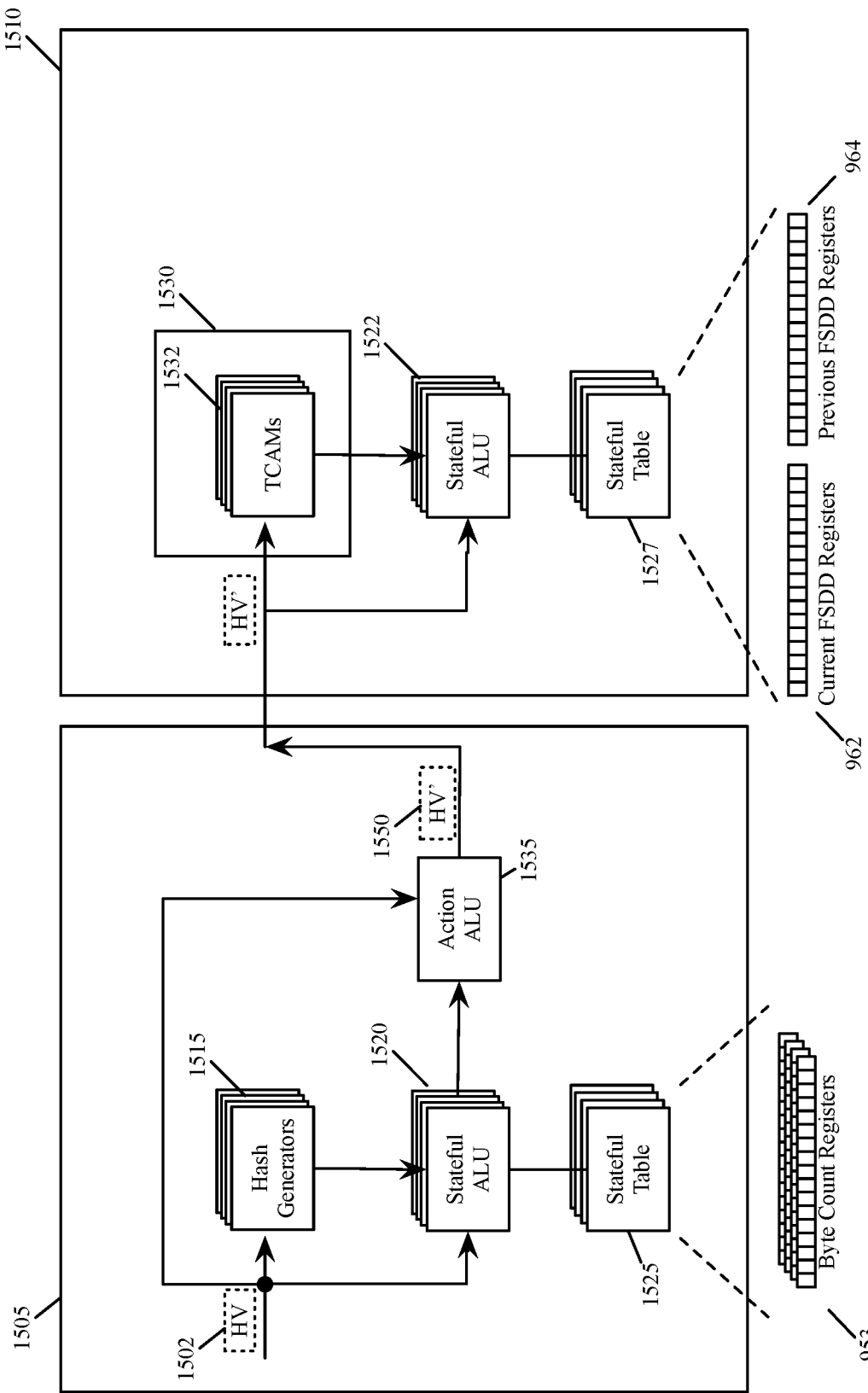
FIG. 15 shows two MAU stages implementing an FS detection circuit.

FIG. 14 illustrates a process 1400 that shows how the FS detection circuit 950 is implemented in some embodiments with the MAU circuit 700 of FIG. 7 serving as the message processing stages 632 of the message processing pipelines 640 and 642 of the data plane 920. This process is performed for each data message that the data plane 920 receives. This process is explained by reference to FIG. 15, which shows two MAU stages 1505 and 1510 implementing the FS detection circuit 950.

The process starts when the MAU stage 1505 receives a header vector 1502 for a message being processed by the data plane 920. As shown, four hash generators 1515 of the MAU stage 1505 initially generate (at 1405) four hash values from a set of header values (e.g., L2, L3 and/or L4 header values) of the received data message. These hash generators are part of the match unit of the MAU stage 1505. This MAU stage in some embodiments is similar to the MAU 700 of FIG. 7. Instead of using four hash generators, other embodiments generate the four hash values by selecting different parts of one or two hash values generated by one or two hash generators.

Next, at 1410, four stateful ALUs 1520 of the first MAU stage use the received message's payload size to increment the byte count values stored at four stateful-ALU cells (in four stateful ALU tables 1525) that are identified by four addresses specified by the four generated hash values. The four-stateful-ALU cells belong to the four byte-count registers that are associated with the current epoch. In some embodiments, sixteen different sets of cells in each stateful ALU are used to define sixteen different registers for sixteen different epochs. To increment the byte count of a cell with the current message's payload size, a counter-implementing stateful ALU 1520 first checks the time stamp for the cell. When the time stamp for the cell is associated with an earlier epoch (i.e., is not associated with the current epoch), the stateful ALU 1520 sets the value of the cell to the current message's payload size (i.e., discards any non-zero value that was stored at this location). On the other hand, when the time stamp for the cell is associated with the current epoch, the stateful ALU adds the current message's payload size to the value that is currently stored in this cell.

At 1415, the stateful ALUs 1520 output the four byte count values of the four cells incremented at 1410 to the action ALU 1535 of its MAU 1505, which then selects (at 1415) the smallest byte count value and stores (at 1415) this selected byte count in a revised header vector 1550 for the message for a subsequent MAU 1510 to process. At 1420, the match stage 1530 of the subsequent MAU 1510 retrieves this byte count, uses this byte count to perform a first lookup in a first TCAM (ternary content addressable memory) 1532 that stores the current register cell index for different sub-ranges of byte count values, and uses this byte count minus the current message's payload size to perform a second lookup in a second TCAM 1532 that stores the previous register cell index for different sub-ranges of byte counts minus current payload sizes. U.S. patent application Ser. No. 15/382,711 describes TCAMs that can perform range lookups, and is incorporated herein by reference.

For the examples illustrated in FIGS. 11 and 12, the TCAM lookups would return the indices of 1 and 0 in the first and second FSDD registers 962 and 964. The byte counts in these examples are 20 and 10, while the byte counts minus the payload sizes are 0 in these examples. For the byte counts 20 and 10, the current FSDD TCAM stores an index value of 1 for the current FSDD register because the sub-ranges are 50 KB increments in these examples. Even though the two TCAMs store the same sub-ranges, some embodiments use two TCAMs so that two simultaneous look up operations can be performed for the current and previous FSDD registers. Other embodiments use just one TCAM when identical sub-ranges are used for the current and previous FSDD registers.

At 1425, the stateful ALUs 1522 of the subsequent MAU 1510 determine whether the two indices identified at 1420 are identical. If so, the process ends, as there is no need to increment the current and previous FSDD register cells identified by these indices as the incremented values would cancel each other out when the previous FSDD is subtracted from the current FSDD. On the other hand, when the two indices identified at 1420 are not identical, one stateful ALU 1522 (that implements the current FS distribution tracker 956) increments (at 1430) by 1 the cell in its stateful ALU table 1527 (that implements the current FSDD register 962) that is identified by the index identified for the current FSDD register of the current epoch.

Next, at 1435, another stateful ALU 1522 (that implements the previous FS distribution tracker 958) increments by 1 the cell in its stateful ALU table 1527 (that implements the previous FSDD register 964) that is identified by the index identified for the previous FSDD register of the current epoch. FIG. 13 illustrates an example of the operations 1430 and 1435 by showing the value of the second cell of the current FSDD register 962 being set to 1 and showing the value of the first cell of the previous FSDD register 964 being set to 1. Both of these cells stored a value of 0 before these incrementing operations.

As mentioned above, the local control plane 625, a remote control plane, or a remote machine (e.g., a remote server) receives or collects, periodically or on demand, the FSDDs that are stored in the current and previous FSDD registers 962 or 964 for one or more epochs (e.g., for 16 epochs stored in 16 pairs of current/previous FSDD registers). From each pair of FSDDs, the local/remote control plane or the remote machine can compute the FSDD for the period associate with the pair, by subtracting the pair's previous FSDD from the pair's current FSDD. In some embodiments, the current and previous FSDDs (stored in registers 962 and 964) are supplied to (e.g., in header vectors) components in the data plane (e.g., ALUs in the dataplane) that subtract each previous FSDD from its corresponding current FSDD to generate an overall FSDD for an epoch, which is then supplied to the local/remote control plane or a remote machine.

Through the control/data plane interface 930, the local control plane 625 can retrieve the FSDDs from the registers 962 or 964, or receive data-plane generated data messages that include the FSDDs. A remote control plane or a remote machine can also receive the FSDDs through data-plane generated data messages that include the FSDDs. As described above, the data-plane generated data messages are generated by one or more message generators 635 of the data plane in some embodiments.

In some embodiments, the data plane can also be configured to store interesting FSDDs (i.e., FSDDs that meet a threshold criteria) outside of the FSDD registers. For instance, to do this, the message generators 635 generate data messages that have their header vectors populated with current and previous FSDDs that are stored in current and previous FSDD registers. These header vectors are so populated by the MAUs that implement the FS detection circuit 950. These header vectors are then processed by subsequent MAUs that determine whether the FSDDs that they contain satisfy one or more interesting criteria (e.g., identify a specific number of large flows). If so, these subsequent MAUs store the FSDDs; otherwise, the discard them. In some embodiments, the subsequent MAUs subtract each previous FSDD from its corresponding current FSDD in order to obtain an overall FSDD for a time period, which they then analyze to determine whether this resulting FSDD is interesting. Different embodiments use different threshold criteria to determine whether an FSDD is interesting. For example, some embodiments count the number of HHDs and/or number of flows specified by the FSDD as a set of one or more criteria to express whether an FSDD is interesting.

Instead of relying of the message generators 635 to generate data messages for reading the FSDD registers, other embodiments have the MAUs that implement the FSDD registers write their FSDD register values into the header vectors as the externally received data messages are being processed for forwarding and for populating the FSDD registers. In these embodiments, subsequent MAUs then determine whether the FSDDs that are contained in these header vectors satisfy one or more interesting criteria (e.g., identify a specific number of large flows). If so, these subsequent MAUs store the FSDDs; otherwise, the discard them. Again, in some embodiments, the subsequent MAUs subtract each previous FSDD from its corresponding current FSDD in order to obtain an overall FSDD for a time period, which they then analyze to determine whether this resulting FSDD is interesting.

Also, in some embodiments, the MAUs that implement the FSDD registers only write their FSDD register values for a previously completed epoch (e.g., epoch 1) into the header vectors of a data message that is received from outside of the forwarding element in a subsequent epoch (e.g., epoch 2). This allows the subsequent MAUs to perform their analysis on a completed epoch's data instead of repeatedly performing this analysis for a current epoch.

The local/remote control plane or remote machine that receives the FSDDs in some embodiments analyze the FSDDs to perform congestion assessment in the network. Such analysis would allow a network administrator to identify congested network forwarding elements, and message throughput of these forwarding elements. It also allows the administrator to identify aggregated and burst behaviors in the network, and to identify packet/flow size distributions in the network. It also allows these assessments to be performed on sub-millisecond periods. This assessment allows network administrators to identify sources and time periods of congestion. The assessment also allows the administrators to perform network and capacity planning.

While the invention has been described with reference to numerous specific details, one of ordinary skill in the art will recognize that the invention can be embodied in other specific forms without departing from the spirit of the invention. For instance, while several embodiments of the invention have been described by reference to hardware forwarding elements, one of ordinary skill will realize that other embodiments are implemented on software forwarding elements (executing on computers), network interface cards, and/or network appliances (e.g., middlebox appliances). Also, some embodiments are implemented by an appliance that is not a forwarding element but is a dedicated appliance for detecting heavy hitters and/or for computing FSDDs.

Also, other embodiments can be implemented differently than the embodiments described above (e.g., instead of incrementing current and previous distributions 962 and 964 by 1, other embodiments increment these registers by other constant values). Accordingly, one of ordinary skill in the art would understand that the invention is not to be limited by the foregoing illustrative details, but rather is to be defined by the appended claims.

The invention claimed is:

1. For a network forwarding element, a data-plane circuit for forwarding data messages within a network, the data-plane circuit comprising:
   a plurality of programmable stages to perform data message forwarding operations on data tuples associated with data message flows received by the data-plane circuit in order to forward the data message flows within the network; and
   a flow-size detection circuit to generate a flow-size density distribution that expresses a number of flows in different flow-size sub-ranges in a range of flow sizes, wherein the flow-size density distribution comprises a number of processed data messages in a flow during a time period.

2. The data-plane circuit of claim 1, wherein the density distribution is a probabilistic density distribution that is based on probabilistic statistical values that the flow-size detection circuit is to generate for the data message flows that are processed for forwarding within the network.

3. The data-plane circuit of claim 2, wherein the flow-size detection circuit is to generate probabilistic statistical values for the data message flows by generation of hash values from header values of the data message flows and accumulation of flow-size values at memory locations identified by the generated hash values.

4. The data-plane circuit of claim 2, wherein the flow-size (FS) density distribution is a first FS density distribution that the FS detection circuit maintains for a particular time period, and the FS detection circuit comprises:
- a current message FS distribution tracker to update, for a received message that is part of a particular message flow, a second FS density distribution (FSDD) stored in a first FSDD register based on a first flow size that the FS detection circuit maintains for the particular message flow in the particular time period, the first flow size including a payload size of the received message; and
- a previous message FS distribution tracker to update a third FSDD stored in a second FSDD register based on a second flow size that the FS detection circuit maintained for the particular message flow before the processing of the received message,
- wherein the first FSDD is computed by subtraction of the third FSDD from the second FSDD, and
- wherein the update to the third FSDD based on the received message is intended to remove from the first FSDD any previous contribution of any prior message of the particular data message flow to the second FSDD.

5. The data-plane circuit of claim 1, wherein the plurality of programmable stages comprise:
- a first set of programmable stages programmed to perform the data message forwarding operations on the received data message flows, and
- a second set of programmable stages programmed to implement the flow-size detection circuit.

6. The data-plane circuit of claim 1, wherein the density distribution is a density distribution that is defined over a programmable period of time.

7. The data-plane circuit of claim 1, wherein the density distribution is a first density distribution that is defined over a first time period, and the flow-size detection circuit is to generate a second flow-size density distribution that expresses a number of flows in different flow-size sub-ranges in the range of flow sizes during a second time period.

8. The data-plane circuit of claim 1 further comprising a publishing circuit to send a set of data messages storing the flow-size density distribution to a machine separate from the network forwarding element through the network.

9. The data-plane circuit of claim 1, wherein
the network forwarding element comprises a control plane circuit to program the programmable stages of the data-plane circuit, and
the data-plane circuit further comprising a publishing circuit to send a set of data messages storing the flow-size density distribution to the control plane circuit.

10. The data-plane circuit of claim 1, wherein
the network forwarding element comprises a control plane circuit to program the programmable stages of the data-plane circuit, and
the data-plane circuit further comprising a control plane interface through which the control plane circuit is to retrieve the flow-size density distribution.

11. A network forwarding element comprising:
a data-plane circuit to forward data messages within a network; and
a control-plane circuit to program the data-plane circuit;
the data-plane circuit comprising:
- a plurality of programmable stages to perform data message forwarding operations on data tuples associated with data message flow received by the data-plane circuit in order to forward the data message flows within the network; and
- a flow-size detection circuit to generate a flow-size density distribution that expresses a number of flows in different flow-size sub-ranges in a range of flow sizes, wherein the flow-size density distribution comprises a number of processed data messages in a flow during a time period.

12. The network forwarding element of claim 11, wherein the density distribution is a probabilistic density distribution that is based on probabilistic statistical values that the flow-size detection circuit generates for the data message flows that are processed for forwarding within the network.

13. The network forwarding element of claim 12, wherein the flow-size (FS) density distribution is a first FS density distribution that the FS detection circuit maintains for a particular time period, and the FS detection circuit comprises:
- a current message FS distribution tracker to update, for a received message that is part of a particular message flow, a second FS density distribution (FSDD) stored in a first FSDD register based on a first flow size that the FS detection circuit maintains for the particular message flow in the particular time period, the first flow size including a payload size of the received message; and
- a previous message FS distribution tracker to update a third FSDD stored in a second FSDD register based on a second flow size that the FS detection circuit maintained for the particular message flow before the processing of the received message,
- wherein the first FSDD is computed by subtraction of the third FSDD from the second FSDD, and
- wherein the update to the third FSDD based on the received message is intended to remove from the first FSDD any previous contribution of any prior message of the particular data message flow to the second FSDD.

14. The network forwarding element of claim 12, wherein the flow-size detection circuit is to generate probabilistic statistical values for the data message flows by generation of hash values from header values of the data message flows and accumulation of flow-size values at memory locations identified by the generated hash values.

15. The network forwarding element of claim 11, wherein the plurality of programmable stages comprise:
- a first set of programmable stages programmed to perform the data message forwarding operations on the received data message flows, and
- a second set of programmable stages programmed to implement the flow-size detection circuit.

16. The network forwarding element of claim 11, wherein the density distribution is a density distribution that is defined over a programmable period of time.

17. The network forwarding element of claim 11, wherein the density distribution is a first density distribution that is defined over a first time period, and the flow-size detection circuit is to generate a second flow-size density distribution that expresses a number of flows in different flow-size sub-ranges in the range of flow sizes during a second time period.

18. The network forwarding element of claim 11, wherein the data-plane circuit further comprises a publishing circuit to send a set of data messages storing the flow-size density distribution to a machine separate from the network forwarding element through the network.

19. The network forwarding element of claim 11, wherein the data-plane circuit further comprises a publishing circuit to send a set of data messages storing the flow-size density distribution to the control plane circuit.

20. The network forwarding element of claim 11, wherein the data-plane circuit further comprises a control-plane interface through which the control-plane circuit is to retrieve the flow-size density distribution.

* * * * *